United States Patent [19]

Gottschlich et al.

[11] 4,237,048
[45] Dec. 2, 1980

[54] MONOAZO DYESTUFF CONTAINING DI-CYANO SUBSTITUENTS ORTHO TO THE AZO GROUP

[75] Inventors: Alois Gottschlich; Klaus Leverenz, both of Leverkusen, Fed. Rep. of Germany

[73] Assignee: Bayer Aktiengesellschaft, Leverkusen, Fed. Rep. of Germany

[21] Appl. No.: 649,253

[22] Filed: Jan. 15, 1976

Related U.S. Application Data

[60] Division of Ser. No. 361,603, May 18, 1973, Pat. No. 3,962,209, which is a continuation of Ser. No. 28,247, Apr. 17, 1970, abandoned, which is a continuation of Ser. No. 615,898, Feb. 14, 1967, abandoned.

[30] Foreign Application Priority Data

Feb. 17, 1966 [DE] Fed. Rep. of Germany ........... 48454
Jan. 12, 1967 [DE] Fed. Rep. of Germany ........... 51232

[51] Int. Cl.² ..................... C09B 29/08; C09B 29/26; C09B 29/36
[52] U.S. Cl. ................. 260/207.1; 260/152; 260/155; 260/156; 260/205; 260/206; 260/207; 260/207.5; 260/208
[58] Field of Search ............ 260/205, 206, 207, 207.1, 260/207.3, 207.5, 152, 155, 156

[56] References Cited

U.S. PATENT DOCUMENTS

| | | | |
|---|---|---|---|
| 2,173,417 | 9/1939 | Huber | 260/198 |
| 2,888,450 | 5/1959 | Kruckenberg | 260/155 |
| 2,941,992 | 6/1960 | Rhyner et al. | 260/205 |
| 2,955,901 | 10/1960 | Kruckenberg | 260/205 X |
| 2,971,953 | 2/1961 | Rhyner | 260/207.1 |
| 2,972,508 | 2/1961 | Kruckenberg et al. | 260/205 X |
| 3,119,809 | 1/1964 | Nicolaus | 260/158 |
| 3,342,804 | 9/1967 | Mueller | 260/207.1 |
| 3,393,191 | 7/1968 | Mueller | 260/205 |
| 3,483,180 | 12/1969 | Ramanathan | 260/158 |

*Primary Examiner*—Floyd D. Nigel
*Attorney, Agent, or Firm*—Sprung, Felfe, Horn, Lynch & Kramer

[57] ABSTRACT

Azo dyestuff having the formula

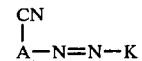

in which A is an aromatic carbocyclic radical containing a CN substituent in the o-position to the azo group and K is the radical of a coupling component as well as the process for their production are disclosed. The process involves cyano exchange between a metal cyanide, e.g. CuCN and the corresponding dyestuff containing Cl or Br instead of CN, in an organic solvent particularly polar aprotic organic solvents, e.g. dimethyl sulfoxide. The dyestuffs are suitable for dyeing a variety of fiber material such as cotton, wool, silk as well as synthetic materials such as polyamide and polyethylene terephthalate to give dyeings which are characterized by great clearness and good general fastness properties.

5 Claims, No Drawings

MONOAZO DYESTUFF CONTAINING DI-CYANO SUBSTITUENTS ORTHO TO THE AZO GROUP

This is a division of application, Ser. No. 361,603, filed May 18, 1973, now U.S. Pat. No. 3,962,209, which is a continuation of Ser. No. 28,247, filed Apr. 17, 1970, now abandoned, which is a continuation of Ser. No. 615,898, filed Feb. 14, 1967, and now abandoned.

The present invention relates to a new process for the production of azo dyestuffs, including novel dyestuffs, which contain cyano groups and correspond to the formula

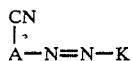

$$A-N=N-K \quad (I)$$
with CN above A.

In this formula, A denotes an aromatic-carbocyclic radical in which the CN-substituent is in the o-position to the azo group, and K is the radical of a coupling component, preferably a N-substituted para-aminoarylene radical.

The radicals A and K can otherwise contain further substituents customary in azo dyestuffs, such as halogen, alkyl, aralkyl, aryl, alkoxy, nitro, cyano, trifluoroalkyl, sulphone, acylamino, acyl groups, primary, secondary and tertiary amino groups, hydroxyl, carboxylic acid, sulphonic acid, carboxylic acid ester or optionally substituted carboxylic acid amide groups or sulphonic acid amide groups and other groupings.

A class of preferred and novel dyestuffs within the scope of the products of the formula (I) corresponds to the formula

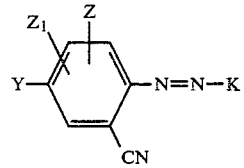

(I a)

In this formula, Y denotes hydrogen or a group —NO$_2$,

—CN, —B$_1$, OR$_1$, —CF$_3$, —SO$_2$R$_1$,

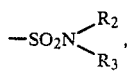

—F, —Cl, —Br or —COR$_4$ in which R$_1$ stands for an optionally substituted alkyl, aralkyl, or aryl radical, R$_2$ and R$_3$ stand for hydrogen or for identical or different substituents which may together also form part of a heterocyclic ring, R$_4$ is hydrogen, —OH, the radical —R$_1$, —OR$_1$ or

R$_9$ stands for an acyl group, preferably a formyl group or an optionally substituted alkylcarbonyl-, arylcarbonyl-, arylalkylcarbonyl-, alkylsulphonyl-, arylsulphonyl-, aminocarbonyl-, alkoxycarbonyl-, aralkoxycarbonyl- or aryloxycarbonyl group and R$_{10}$ denotes hydrogen, an optionally substituted alkyl-, cycloalkyl-, aralkyl- or aryl group or the group R$_9$; R$_9$ and R$_{10}$ may together form also part of a heterocyclic ring, and Z and Z$_1$ are hydrogen or substituents, preferably the groups —NO$_2$, —CN, —R$_1$, —OR$_1$, —CF$_3$, —SO$_2$R$_1$,

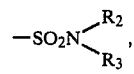

—Cl, —Br and —COR$_4$; K has the meaning above.
Suitable radicals

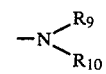

are for example the following:

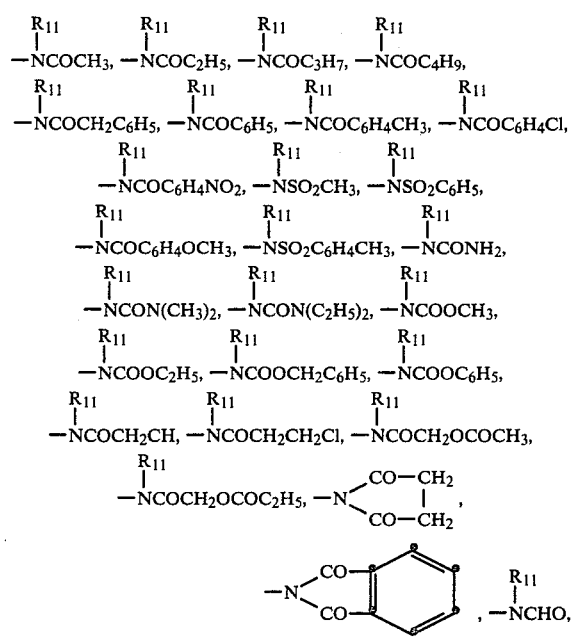

wherein R$_{11}$ stands for hydrogen, or an optionally substituted alkyl group, preferably a group with 1-4 C-atoms.

The process according to the invention consists in that dyestuffs of the general formula

(II)

and in particular dyestuffs of the general formula

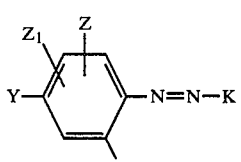

(II a)

in which X stands for a halogen substituent, preferably Cl or Br, which stands in the radical A in the o-position to the azo group, and Y, Z, $Z_1$, A and K have the same meaning as above, are reacted with metal cyanides, preferably, copper(I) cyanide or compounds forming copper(I) cyanide, in an organic medium with the exchange of the halogen substituent X for the cyano substituent.

In the case where the starting dyestuffs of the formula (II) contain a second halogen substituent, preferably in the o-position to the azo group, or where the radical Z in starting dyestuffs of the formula (IIa) represents a halogen substituent, preferably Cl or Br and preferably in the ortho-position to the azo group, also this halogen substituent can be exchanged for a cyano group, depending upon the reaction conditions and reaction components, with the formation of dicyanoaryl-azo dyestuffs, for example, 2,6-dicyanoaryl-1-azo dyestuffs.

The starting dyestuffs of the formula (II) or (IIa) can be used for the reaction in the form of a paste or, preferably, in the dry state. Suitable organic reaction media are, in particular, polar aprotic organic solvents, such as dimethyl sulphoxide, formamide, dimethyl formamide, dimethyl acetamide, N-methyl-pyrrolidone, pyridine, quinoline, acetonitrile, benzonitrile and phosphoric acid-tris-dimethylamide. Small amounts of water do not interfere with the reaction.

Suitable metal cyanides are, inter alia, copper(I) cyanide, silver cyanide, lead cyanide, potassium hexacyanoferrate(II), calcium hexacyanoferrate(II), copper hexacyanoferrate(II) and zinc cyanide. Among those copper(I) cyanide is of special interest because of its outstanding reactivity. It can be used as such or it can also be formed in the reaction medium, for example, by the addition of alkali metal cyanides and suitable copper(II) salts, such as copper(II) sulphate or copper(II) acetate, to the reaction mixture.

The reaction temperature may vary within a wide range. It depends on the nature of the organic medium and, in particular, on the constitution of the starting dyestuff (II). In general, the temperature is between about 20° and 220° C., temperatures between 25° and 150° C. being preferred.

The reaction can be carried out in such a manner that the starting dyestuffs (II) or (IIa) are dissolved or suspended in the organic medium with the metal cyanide, preferably copper(I) cyanide, or with the compounds forming copper(I) cyanide, and, if necessary, heated to an elevated temperature. The progress of the reaction can be controlled by paper or thin layer chromatography. After completion of the reaction, the reaction products can be precipitated, for example, with water. Any excess metal cyanide, such as copper(I) cyanide or copper(I) halide, can be separated from the reaction products obtained by conversion into water-soluble complex salts according to known methods, for example, with the aid of ammonia or alkali metal cyanide, or by oxidation of copper(I) salts to water-soluble copper(II) salts, for example, with iron(III) chloride.

If a second halogen substituent is present in the starting dyestuffs (II) in the ortho-position to the azo group of the radical A, or if Z is a halogen substituent in the o-position to the azo group in compounds (IIa), then it is also possible, according to the process of the invention, to introduce two ortho-positioned cyano substituents into the radical of the diazo component of the dyestuffs; this leads to dyestuffs of the formula

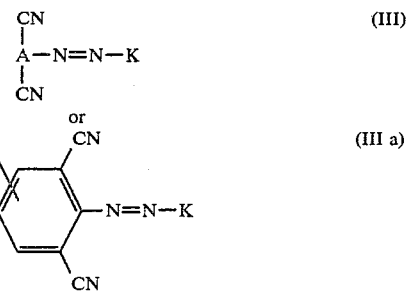

in which A, Y, $Z_1$ and K have the same meaning as above and the two cyano substituents in A stand in the o-position to the azo group.

It is particularly surprising that a second halogen atom in the ortho position of the diazo component can be easily exchanged. Hitherto 2,6-dicyano-aniline dyestuffs of the formula (III) have only been described in one Example of German Patent Specification No. 942,221.

If two ortho-positioned halogen substituents are present in the radical of the diazo component of the starting dyestuffs (II) or (IIa), it is possible to perform the exchange of both halogen atoms as well as the partial exchange of the halogen substituents for cyano. The partial exchange succeeds with particular case in the case of dyestuffs of the formula (II) or (IIa) in which two substituents in the ortho-position to the azo group of the diazo components are chlorine substituents or one is a bromine and the other a chlorine substituent. In the last-mentioned case the bromine substituent is first exchanged for CN.

Suitable diazo components for the synthesis of the starting dyestuffs (II) or (IIa) are, inter alia: 2-bromo-1-amino-naphthalene, 2-chloro-1-amino-naphthalene, 1-bromo-2-amino-naphthalene, 1-chloro-2-amino-naphthalene, 2-bromo-1-amino-anthraquinone, 2,4-dibromo-1-amino-anthraquinone and, in particular, those of the benzene series, such as 2-chloro-aniline, 2-bromo-aniline, 2,3-dichloro-aniline, 2,4-dichloro-aniline, 2,4-dibromo-aniline, 2,5-dichloro-aniline, 2,6-dichloro-aniline, 2,4,5-trichloro-aniline, 2,4,5-trichloro-6-bromo-aniline, 2,4,6-trichloro-aniline, 2,4,6-tribromo-aniline, 2,4-dichloro-6-bromo-aniline, 2,6-dibromo-4-chloro-aniline, 2-amino-3-chloro-toluene, 2-amino-3-bromo-toluene, 3-chloro-4-amino-toluene, 3-bromo-4-amino-toluene, 4-chloro-3-amino-toluene, 4,6-dichloro-3-amino-toluene, 3,5-dichloro-4-amino-toluene, 3,5-dibromo-4-amino-toluene, 2,4-dimethyl-6-bromo-aniline, 2,4-dimethyl-6-chloro-aniline, 3,6-dichloro-4-amino-anisole, 3,5-dibromo-4-amino-anisole, 2-bromo-4,6-dimethoxy-aniline, 2-chloro-6-nitro-aniline, 2-bromo-6-nitro-aniline, 2-chloro-4-methyl-6-nitro-aniline, 2-bromo-4-methyl-6-nitro-aniline, 2-amino-3-bromo-5-methyl-1-methylsulphonyl-benzene, 2-chloro-4-nitroaniline, 2-bromo-4-nitro-aniline, 2,6-dichloro-4-nitroaniline, 2-bromo-6-chloro-4-nitro-aniline, 2,6-dibromo-4-nitroaniline, 3,5-dibromo-4-amino-benzoic acid, 3,5-dibromo-4-amino-benzoic acid methyl ester, 3,5-dibromo-4-amino-1-cyanobenzene, 3,5-dichloro-4-amino-1-cyanobenzene, 3,5-dibromo-4-amino-1-methylsulphonyl-benzene, 3,5-dichloro-4-amino-1-methylsulphonyl-benzene, 3,5-dichloro-4-aminobenzene-sulphonamide, 3,5-dibromo-4-amino-benzene-sulphonamide, 3,5-dichloro-4-amino-acetophenone, 3,5- dibromo-4-amino-acetophenone, 3,5-dibromo-4-amino-benzophenone, 3,5-dibromo-4-amino-1-trifluoromethyl-benzene, 2-bromo-4-cyano-aniline, 2-amino-3-bromo-5-nitro-benzoic acid methyl ester, 2-amino-3-bromo-5-nitro-1-trifluoromethyl-benzene, 2-amino-3-bromo-5-nitro-1-methyl-sulphonyl-benzene, 2-bromo-4,6-bis-(methylsulphonyl)-aniline, 2-amino-3-bromo-5-nitro-anisole, 2-amino-3-bromo-5-nitro-toluene, 3-bromo-4-amino-5-nitrobenzaldehyde, 3-bromo-4-amino-5-nitro-1-cyanobenzene, 6-chloro-2,4-dinitro-aniline, 6-bromo-2,4-dinitro-aniline, 2-cyano-6-chloro-4-nitro-aniline, 2-cyano-6-bromo-4-nitro-aniline, 2-bromo-4,6-dicyano-aniline, 3,5-dichloro-4-amino-acetanilide, 3,5-dibromo-4-amino-acetanilide, 3,5-dichloro-4-amino-glycolic-acid-anilide, 3,5-dibromo-4-amino-glycolic acid-anilide, 3,5-dichloro-4-amino-α-chloro-acetanilide, 3,5-dibromo-4-amino-α-chloro-acetanilide, 3,5-dichloro-4-amino-α-cyano-acetanilide, 3,5-dibromo-4-amino-α-cyano-acetanilide, 3,5-dichloro-4-amino-β-chloropropionic acid-anilide, 3,5-dibromo-4-amino-β-chloropropionic acid-anilide, 3,5-dibromo-4-amino-1-(N-ethyl-N-acetyl-amino)-benzene, 3,5-dibromo-4-amino-1-(N-cyclohexyl-N-acetyl-amino)-benzene, N-(3,5-dibromo-4-amino-phenyl)-carbamic acid-methylester, N-(3,5-dibromo-4-amino-phenyl)-carbamic acid-ethylester, (3,5-dibromo-4-amino-phenyl)-urea, N,N-dimethyl-N'-(3,5-dibromo-4-amino-phenyl)-urea, 3,5-dibromo-4-amino-1-(N-ethyl-N-methylsulfonyl-amino)-benzene, 3,5-dichloro-4-amino-1-(N-benzoyl-amino)-benzene, 3,5-dibromo-4-amino-1-(N-ethyl-N-benzoyl-amino)-benzene, 3,5-dibromo-4-amino-1-(N-4'-nitrobenzoyl-amino)-benzene, 3,5-dibromo-4-amino-1-(N-ethyl-N-benzenesulfonyl-amino)-benzene, N-(3,5-dibromo-4-amino-phenyl)-succinimide, N-(3,5-dibromo-4-amino-phenyl)-maleic acid-imide, N-(3,5-dibromo-4-amino-phenyl)-phthalic acid-imide.

Suitable coupling components for the synthesis of the starting dyestuffs (II) are, for example: aniline and its N-alkyl derivatives such as N-methyl-aniline, N-ethyl-aniline, N,N-dimethyl-aniline, N,N-diethyl-aniline, N-(β-hydroxyethyl)-aniline, N-methyl-N-(β-hydroxyethyl)-aniline, N-ethyl-N-(β-hydroxyethyl)-aniline, N-butyl-N-(β-hydroxyethyl)-aniline, N,N-bis-(β-hydroxyethyl)-aniline, N-(β-cyanoethyl)-aniline, N-methyl-N-(β-cyanoethyl)-aniline, N,N-bis-(β-cyanoethyl)-aniline, N-(β-hydroxyethyl)-N-(β-cyanoethyl)-aniline, N-(β-carbomethoxyethyl)-aniline, N-ethyl-N-(β-carboethoxy-ethyl)-aniline, N-(β-cyanoethyl)-N-(β-carbomethoxyethyl)-aniline, N,N-bis(β-carbomethoxyethyl)-aniline, N-ethyl-N-(β-acetoxyethyl)-aniline, N-(β-cyanoethyl)-N-(β-acetoxyethyl)-aniline, N,N-bis-(β-acetoxyethyl)-aniline, N-ethyl-N-(β-methoxyethyl)-aniline, N,N-bis-(2,3-dihydroxypropyl)-aniline, N-ethyl-N-(2-hydroxy-3-chloropropyl)-aniline, N-benzyl-N-(β-cyanoethyl)-aniline, and also 3-chloro-aniline, 3-methyl-aniline, 2,5-dimethyl-aniline, 3-methoxy-aniline, 3-ethoxy-aniline, 5-methyl-2-methoxy-aniline, 5-methyl-2-ethoxy-aniline, 2,5-dimethoxy-aniline, 3-acetylamino-aniline, 2-methoxy-5-acetylamino-aniline, 2-ethoxy-5-acetylamino-aniline and its N-substituted derivatives corresponding to the above aniline compounds. Furthermore diphenylamine, 1-amino-naphthalene and its N-substituted derivatives, such as 1-(N,N-dimethylamino)-naphthalene or 1-(N-β-hydroxyethylamino)-naphthalene, 1-amino-naphthalene-6-sulphonic acid, 1-amino-naphthalene-7-sulphonic acid, 1,2,3,4-tetrahydro-quinoline and its N-substituted derivatives, such as N-(β-hydroxyethyl)-1,2,3,4-tetrahydro-quinoline and N-(β-cyanoethyl)-1,2,3,4-tetrahydro-quinoline. Furthermore hydroxy-benzene, 1-hydroxy-2-methyl-benzene, 1-hydroxy-3-benzene, 1-hydroxy-3-acetylamino-benzene, 1-hydroxy-3-methoxy-benzene, 1-hydroxy-2,5-dimethyl-benzene, 1-hydroxy-naphthalene, 1-hydroxy-naphthalene-6-sulphonic acid, 1-hydroxy-naphthalene-7-sulphonic acid, 8-hydroxy-quinoline, 2-methyl-indole, 2-phenyl-indole, 2-[N-methyl-N-(β-cyanoethyl)-amino]-4-phenyl-thiazole.

The reaction according to the invention is remarkable over a wide range because of its low reaction temperatures and short reaction times and in this respect it is surprising in comparison with the reactions of halogenated aromatic hydrocarbons with, for example, copper(I) cyanide known from the literature (J.Am.Chem.Soc. 81[1959] 3667; J. Org. Chem. 26 [1961] 2524; J. Chem.Soc. [1964] 1097). Whereas the known reactions require temperatures between 110° and 210° C., the majority of the starting dyestuffs to be used according to the invention can be caused to react with metal cyanides, especially copper(I) cyanide and compounds forming copper(I) cyanide, already at temperatures below 100° C., in some cases even at room temperature, within a short time.

In addition, the process according to the invention offers the possibility of synthesising a great number of valuable 2-monocyano and 2,X-, such as 2,6-, dicyano-substituted benzene-azo-aryl dyestuffs which have hitherto been unknown or the production of which has been substantially simplified in that it is now possible to use the easily obtainable ortho-halo-aniline diazo components instead of having first to prepare ortho-cyano-aniline diazo components.

Preferred dyestuffs are those of the formula

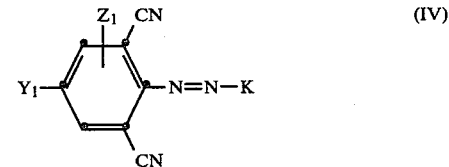

in which K stands for the radical of a coupling component, $Y_1$ for a group —$NO_2$, —CN, —$CF_3$, —$R_1$, —$OR_1$, —$SO_2R_1$,

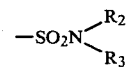

—F, —Br, —$COR_4$ or

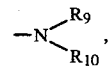

$R_1$ stands for an optionally substituted alkyl, aralkyl or aryl radical, $R_2$ and $R_3$ are hydrogen or identical or different substituents which together may also form part of a heterocyclic ring, $R_4$ is hydrogen, —OH, —$R_1$, —$OR_1$ or —$NR_2R_3$, $R_9$ stands for an acyl group and $R_{10}$ being hydrogen, an optionally substituted alkyl-, cycloalkyl-, aralkyl- or aryl group or the group $R_9$; $R_9$ and $R_{10}$ may together form also part of a heterocyclic ring, and $Z_1$ stands for hydrogen or a substituent, and azo dyestuffs free of sulphonic acid groups of the formula

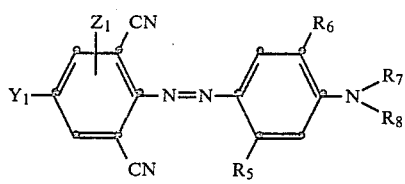

in which $Y_1$ and $Z_1$ have the above said meaning, $R_5$ stands for hydrogen, alkyl, alkoxy, halogen or an acylamino group, $R_6$ is hydrogen, alkyl or alkoxy, $R_7$ is hydrogen or an optionally substituted alkyl radical, and $R_8$ is an optionally substituted alkyl radical.

Even further preferred are the dyestuffs of formula IV wherein $Y_1$ is —$NO_2$.

The dyestuffs which may be obtained according to the above described process are eminently suitable for the dyeing of hydrophobic materials, especially fibre materials made of aromatic polyesters, such as polyethylene-terephthalates and polyesters obtained from terephthalic acid and 1,4-bis-hydroxymethylcyclohexane, cellulose triacetate, cellulose-2½-acetate, synthetic superpolyamides and -polyurethanes, polymers or copolymers of acrylonitrile, and polyolefines.

Dyeing with the dyestuffs of the present invention, and particularly novel dyestuffs of Formula IV and V, is carried out in such a manner that the material to be dyed is introduced into an aqueous solution or dispersion of the dyestuffs, preferably at an elevated temperature, for example, at 40° C., that conventional auxiliaries are added, such as sulphite cellulose decomposition products, condensation products of higher alcohols with ethylene oxide, polyglycol ethers of fatty acid amides or or alkylphenols, sulphosuccinic acid esters of Turkey red oil, and the bath is preferably admixed with acidic agents, for example, with organic acids, such as formic acid or acetic acid, or with inorganic acids, such as phosphoric acid. The bath is then heated to the optimum dyeing temperature, preferably to a temperature between 70° and 140° C., depending upon the type of fibre materials to be dyed. Dyeing is carried out at this temperature, until the desired intensity of colour is achieved. When the bath has cooled, the dyed fibre material can be subjected to an after-treatment, for example, to an after-treatment with soaps in the case of acetate fibres, or to a reductive after-treatment with the addition of alkali in the case of fibres of aromatic polyesters.

If the dyestuffs contain no water-solubilizing carboxyl or ammonium groups, they are preferably used in dispersed form. Suitable dispersing agents are, for example, dinaphthyl-methane sulphonate or condensation products of cresol-2-naphthol-6-sulphonic acid and formaldehyde.

When dyeing aromatic polyesters or triacetate fibres, at temperatures up to 105° C., it is generally advantageous to add conventional carrier substances, such as mono-, di- or trichlorobenzene, benzoic acid, salicyclic acid, salicyclic acid methyl ester, cresotic acid methyl ester, o-, or p-phenyl-phenol, β-naphthyl ethyl ether or benzyl alcohol.

Printing is also carried out in known manner by applying to the materials a printing paste which contains the dyestuff or dyestuffs and the usual auxiliaries, and subsequently subjecting the materials to a warm or hot treatment.

The dyestuffs of the formula (I) are suitable for dyeing and printing fibre fabrics, fibre yarns and endless yarns, combed material or loose material and mixed fabrics of fibres of the said type with natural fibres, such as cotton, wool and silk, or mixed fabrics of the hydrophobic fibres with one another. The dyeings are characterized by great clearness and good general fastness properties.

The present invention is further illustrated by the following examples in which all parts and percentages are by weight unless otherwise stated, and the temperatures are in degrees Centigrade.

EXAMPLE 1

14 Grams of the azo dyestuff 2-bromo-6-chloro-4-nitroaniline→1-N,N-diethylamino-3-acetylamino-benzene are dissolved in 150 ml. N-methyl-pyrrolidone and 5 g. copper(I) cyanide are added. The solution changes to blue-violet after some time; after 90 minutes, the starting dyestuff can no longer be detected in a thin layer chromatogram. After a further 3 hours, the resultant crystalline precipitate is filtered off with suction and recrystallized from dimethyl formamide/water (6:1), m.p. 244°. The dyestuff has the formula

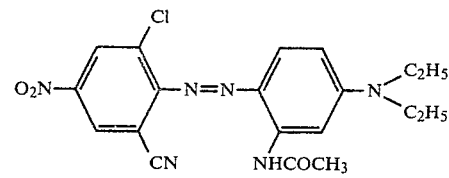

A CN-band can be clearly recognized in the infrared spectrum of the reaction product; determination of the molecular weight by mass spectroscopy yields the value 414 calculated for the above formula.

Analysis ($C_{19}H_{19}ClN_6O_3$)

Calc.: C,55.0; H,4.58; Cl,8.57; N,20.3; O,11.6.
Found: C,55.56; H,4.81; Cl,8.42; N,20.19; O,11.75.

According to melting point, mixed melting point and thin layer chromatogram the reaction product is identical with the amo dyestuff which is obtained by coupling diazotised 2-amino-3-chloro-5-nitro-1-cyanobenzene with 1-N,N-diethylamino-3-acetylamino-benzene.

EXAMPLE 2

7.7 Grams of the azo dyestuff 2,4-dinitro-6-bromoanilino→1-N-(p-cyanoethyl)-N-(p-hydroxyethyl)-amino-2-methoxy-3-acetyl-amino-benzene are dissolved in 60 ml. dimethyl formamide and added at room temperature to a solution of 1.0 g. copper(I) cyanide in 20 ml. dimethyl formamide. The temperature rises slightly and the colour of the solution changes from navy-blue to greenish blue. After stirring for one hour, the reaction product is precipitated with a little ice-water, filtered off with suction and stirred in a solution of 5 g. potassium cyanide in 60 ml. of water for 2 hours in order to remove the copper(I) salts. The resultant dyestuff of the formula

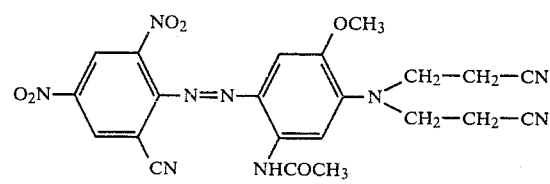

is filtered off with suction and washed several times with water. The Beilstein test for halogen is negative, the determination of the molecular weight by mass spectroscopy yields the value 550 calculated for the above formula.

EXAMPLE 3

6.6 Grams of the azo dyestuff 2,4-dinitro-6-bromoaniline→N-butyl-N-(β-cyanoethyl)-aniline are dissolved in 60 ml. dimethyl sulphoxide, 1.6 g. copper(I) cyanide are added and the mixture is heated at 70° for 2 hours, while stirring. The colour of the solution changes to violet. After cooling, the reaction product is precipitated by the addition of ice-water. The resultant dyestuff of the formula

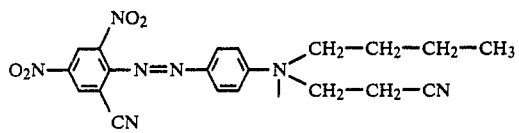

proves to be identical with the dyestuff prepared by diazotising 2-amino-3,5-dinitro-1-cyanobenzene and coupling with N-butyl-N-(p-cyanoethyl)-aniline.

EXAMPLE 4

6.17 Grams of the azo dyestuff which is obtained by dianotising 2-bromo-4,6-dicyano-aniline in concentrated sulphuric acid and coupling with 1-N,N-diethylamino-3-ethoxybenzene, are dissolved in 40 ml. N-methyl-pyrrolidone and combined with a solution of 1.6 g. copper(I) cyanide in 20 ml. N-methyl-pyrrolidone. The mixture is heated to 80°, while stirring. At this temperature the colour of the solution changes from red to violet. After 3 hours the starting dyestuff can no longer be detected in a thin layer chromatogram. The reaction product is precipitated by the addition of ice-water, filtered off with suction and thoroughly stirred with 50 ml. of a 10% aqueous ammonia solution in order to remove the copper(I) salts. After another suction-filtration and washing with water, halogen can no longer be detected. The dried dyestuff dissolves in dimethyl formamide with a violet colour. It corresponds to the formula

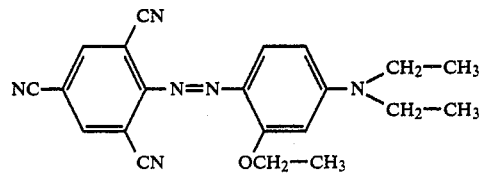

Determination of the molecular weight by mass spectroscopy yields the value 375 palculated for the above formula.

If the halogen-containing azo dyestuffs listed in the column "starting material" of the following Table are reacted with copper(I) cyanide in the stated solvent at the stated temperature, then there are obtained the cyano group-containing azo dyestuffs which are listed in the column "reaction product"; the colour of their solution in dimethyl formamide can be seen from the last column.

| No. | Starting material | Reaction product | Solvent | Temperature | Colour of solution in dimethyl formamide |
|---|---|---|---|---|---|
| 1 | 2-bromo-4,6-dinitro-aniline → N-(β-cyanoethyl)-N-(β-hydroxyethyl)-aniline | | N-methyl-pyrrolidone | 70° | violet |
| 2 | 2-bromo-4,6-dinitro-aniline → N-(β-cyanoethyl)-N-(β-hydroxyethyl)-m-toluidine | | dimethyl formamide | 90° | blue-violet |
| 3 | 2-bromo-4,6-dinitro-aniline → N,N-bis-(β-hydroxyethyl)-m-toluidine | | dimethyl acetamide | 90° | blue |
| 4 | 2-bromo-4-nitroaniline → N-(β-cyanoethyl)-N-(β-hydroxyethyl)-aniline | | N-methyl-pyrrolidone | 150° | bluish red |
| 5 | 2,4-dichloro-aniline → N-butyl-N-β-hydroxyethyl-aniline | | N-methyl-pyrrolidone | 200° | yellowish red |

-continued

| No. | Starting material | Reaction product | Solvent | Temperature | Colour of solution in dimethyl formamide |
|---|---|---|---|---|---|
| 6 | 2-bromo-6-chloro-4-nitroaniline → N-ethyl-N-(β-carbomethoxy-ethyl)-3-acetamino-aniline | $O_2N$–⟨Cl, CN⟩–N=N–⟨NHCOCH$_3$⟩–N(CH$_2$–CH$_3$)(CH$_2$–CH$_2$–COOCH$_3$) | N-methyl-pyrrolidone | 25° | violet |
| 7 | 2,6-dichloro-4-nitroaniline → N,N-diethyl-3-acetamino-aniline | $O_2N$–⟨Cl, CN⟩–N=N–⟨NHCOCH$_3$⟩–N(CH$_2$–CH$_3$)$_2$ | N-methyl-pyrrolidone | 25° | violet |
| 8 | 2-bromo-6-chloro-4-nitroaniline → N-methyl-N-(β-cyano-ethyl)-aniline | $O_2N$–⟨Cl, CN⟩–N=N–⟨⟩–N(CH$_3$)(CH$_2$–CH$_2$–CN) | dimethyl sulphoxide | 25° | bordeaux |
| 9 | 2-bromo-4,6-dinitro-aniline → N,N-bis-(β-acetoxyethyl)-2-ethoxy-5-acetamino-aniline | $O_2N$–⟨NO$_2$, CN⟩–N=N–⟨OC$_2$H$_5$, NHCOCH$_3$⟩–N(CH$_2$–CH$_2$–O–COCH$_3$)$_2$ | formamide | 90° | greenish blue |
| 10 | (2-amino-3-bromo-5-nitro-phenyl)-methylsulphone → N,N-diethyl-3-ethoxy-aniline | $O_2N$–⟨SO$_2$CH$_3$, CN⟩–N=N–⟨O–CH$_2$–CH$_3$⟩–N(CH$_2$–CH$_3$)$_2$ | dimethyl sulphoxide | 80° | blue |
| 11 | 3-bromo-5-nitro-2-amino-anisole → N,N-diethyl-3-ethoxy-aniline | $O_2N$–⟨OCH$_3$, CN⟩–N=N–⟨O–CH$_2$–CH$_3$⟩–N(CH$_2$–CH$_3$)$_2$ | dimethyl sulphoxide | 60° | violet |
| 12 | 2-bromo-4,6-dicyano-aniline → N,N-di-(β-hydroxyethyl)-2-methoxy-5-acetamino-aniline | NC–⟨CN, CN⟩–N=N–⟨OCH$_3$, NH–CO–CH$_3$⟩–N(CH$_2$–CH$_2$–OH)$_2$ | dimethyl sulphoxide | 25° | greenish blue |
| 13 | 2-bromo-4,6-dicyano-aniline → N-ethyl-N-(β-carbomethoxy-ethyl)-3-acetamino-aniline | NC–⟨CN, CN⟩–N=N–⟨NH–CO–CH$_3$⟩–N(CH$_2$–CH$_3$)(CH$_2$–CH$_2$–COOCH$_3$) | dimethyl sulphoxide | 50° | blue-violet |
| 14 | 2-bromo-4,6-dicyano-aniline → N-(β-cyano-ethyl)-N-(β-carbomethoxy-ethyl)-aniline | NC–⟨CN, CN⟩–N=N–⟨⟩–N(CH$_2$–CH$_2$–CN)(CH$_2$–CH$_2$–COOCH$_3$) | dimethyl sulphoxide | 60° | red |
| 15 | 2-bromo-4,6-dicyano-aniline → N-ethyl-N-(β-hydroxyethyl)-m-toluidine | NC–⟨CN, CN⟩–N=N–⟨CH$_3$⟩–N(CH$_2$–CH$_3$)(CH$_2$–CH$_2$–OH) | dimethyl sulphoxide | 100° | reddish blue |
| 16 | 2-chloro-aniline → N,N-diethyl-3-acetamino-aniline | ⟨⟩–N=N–⟨NHCOCH$_3$⟩–N(CH$_2$–CH$_3$)$_2$ (with CN) | N-methyl-pyrrolidone | 150° | orange-red |
| 17 | 2-bromo-aniline → N,N-diethyl-3-acetamino-aniline | ⟨CN⟩–N=N–⟨NHCOCH$_3$⟩–N(CH$_2$–CH$_3$)$_2$ | N-methyl-pyrrolidone | 120° | orange-red |

-continued

| No. | Starting material | Reaction product | Solvent | Temperature | Colour of solution in dimethyl formamide |
|---|---|---|---|---|---|
| 18 | 2,5-dichloro-aniline → N,N-diethyl-3-acetamino-aniline | (structure: Cl, CN substituted phenyl–N=N–phenyl with N(CH₂CH₃)₂ and NHCOCH₃) | N-methyl-pyrrolidone | 150° | orange-red |
| 19 | 3-bromo-4-amino-toluene → N,N-diethyl-3-acetamino-aniline | (structure: CH₃, CN substituted phenyl–N=N–phenyl with N(CH₂CH₃)₂ and NHCOCH₃) | N-methyl-pyrrolidone | 110° | orange-red |
| 20 | 2,4-dimethyl-6-bromo-aniline → N,N-diethyl-3-acetamino-aniline | (structure: CH₃, CH₃, CN substituted phenyl–N=N–phenyl with N(CH₂CH₃)₂ and NHCOCH₃) | N-methyl-pyrrolidone | 60° | orange-red |
| 21 | 2-bromo-4,6-dimethoxy-aniline → N,N-diethyl-3-acetamino-aniline | (structure: OCH₃, CH₃O, CN substituted phenyl–N=N–phenyl with N(CH₂CH₃)₂ and NHCOCH₃) | N-methyl-pyrrolidone | 50° | red |
| 22 | 3-chloro-2-amino-toluene → N,N-diethyl-3-acetamino-aniline | (structure: CH₃, CN substituted phenyl–N=N–phenyl with N(CH₂CH₃)₂ and NHCOCH₃) | N-methyl-pyrrolidone | 120° | orange-red |
| 23 | 2,5-dibromo-aniline → N,N-diethyl-3-acetamino-aniline | (structure: CN, CN substituted phenyl–N=N–phenyl with N(CH₂CH₃)₂ and NHCOCH₃) | N-methyl-pyrrolidone | 180° | Bordeaux |
| 24 | 2-bromo-4-nitro-6-cyano-aniline → N-ethyl-N-(β-carbomethoxyethyl)-3-acetamino-aniline | (structure: O₂N, CN, CN substituted phenyl–N=N–phenyl with N(CH₂CH₃)(CH₂CH₂COOCH₃) and NHCOCH₃) | dimethyl-formamide | 50° | blue |
| 25 | 2-chloro-4-nitro-6-cyano-aniline → N,N-bis-(β-methoxycarbonyloxy-ethyl)-3-acetamino-aniline | (structure: O₂N, CN, CN substituted phenyl–N=N–phenyl with N(CH₂CH₂OCOOCH₃)₂ and NHCOCH₃) | dimethyl-formamide | 80° | blue |
| 26 | 6-chloro-4-nitro-aniline → N,N-diethyl-3-acetamino-aniline | (structure: O₂N, CN substituted phenyl–N=N–phenyl with N(CH₂CH₃)₂ and NHCOCH₃) | N-methyl-pyrrolidone | 120° | red-violet |
| 27 | 2,5-dichloro-4-nitro-aniline → N,N-diethyl-3-acetamino-aniline | (structure: Cl, O₂N, CN substituted phenyl–N=N–phenyl with N(CH₂CH₃)₂ and NHCOCH₃) | N-methyl-pyrrolidone | 110° | red-violet |
| 28 | 2,5-dichloro-4-nitro-aniline → N,N-diethyl-3-acetamino-aniline | (structure: NC, O₂N, CN substituted phenyl–N=N–phenyl with N(CH₂CH₃)₂ and NHCOCH₃) | N-methyl-pyrrolidone | 130° | blue-violet |
| 29 | 2,5-dichloro-4-amino-benzonitril → N,N-diethyl-3-acetamino-aniline | (structure: Cl, NC, CN substituted phenyl–N=N–phenyl with N(CH₂CH₃)₂ and NHCOCH₃) | N-methyl-pyrrolidone | 100° | ruby |

| No. | Starting material | Reaction product | Solvent | Temperature | Colour of solution in dimethyl formamide |
|---|---|---|---|---|---|
| 30 | 2,5-dichloro-4-amino-benzonitrile → N-butyl-N-(β-acetoxyethyl)-aniline | NC—C₆H₂(CN)(NC)—N=N—C₆H₄—N(CH₂CH₂CH₂CH₃)(CH₂CH₂OCOCH₃) | N-methyl-pyrrolidone | 140° | violet |
| 31 | 4-bromo-3-nitro-aniline → N,N-diethyl-3-acetamino-aniline | NC—C₆H₂(O₂N)—N=N—C₆H₃(NHCOCH₃)—N(CH₂CH₃)₂ | N-methyl-pyrrolidone | 120° | red |
| 32 | 3-bromo-5-chloro-4-aminobenzotrifluoride → N,N-bis-(β-hydroxyethyl)-3-acetamino-aniline | F₃C—C₆H₂(Cl)(CN)—N=N—C₆H₃(NHCOCH₃)—N(CH₂CH₂OH)₂ | N-methyl-pyrrolidone | 30° | ruby |
| 33 | 2-bromo-4,6-dicyan-aniline → N,N-bis-(β-hydroxyethyl)-m-toluidine | NC—C₆H₂(CN)(CN)—N=N—C₆H₃(CH₃)—N(CH₂CH₂OH)₂ | dimethylformamide | 90° | violet |
| 34 | 2-bromo-4,6-dicyano-aniline → N-ethyl-N-β-cyanoethyl-aniline | NC—C₆H₂(CN)(CN)—N=N—C₆H₄—N(CH₂CH₃)(CH₂CH₂CN) | dimethylformamide | 60° | bordeaux |
| 35 | 2-bromo-4,6-dicyano-aniline → N-ethyl-N-β-cyanoethyl-m-toluidine | NC—C₆H₂(CN)(CN)—N=N—C₆H₃(CH₃)—N(CH₂CH₃)(CH₂CH₂CN) | dimethylformamide | 90° | ruby |
| 36 | 2-bromo-4,6-dicyano-aniline → 1-N-(β-hydroxyethyl)-amino-2-methyl-5-acetamino-benzene | NC—C₆H₂(CN)(CN)—N=N—C₆H₂(CH₃)(NHCOCH₃)—N(H)(CH₂CH₂OH) | N-methyl-pyrrolidone | 80° | red-violet |
| 37 | 3-bromo-5-chloro-4-aminobenzotrifluoride → N-ethyl-N-(β-hydroxyethyl)-m-toluidine | F₃C—C₆H₂(Cl)(CN)—N=N—C₆H₃(CH₃)—N(CH₂CH₃)(CH₂CH₂OH) | N-methyl-pyrrolidone | 90° | bordeaux |
| 38 | 2,5-dichloro-4-acetamino-aniline → N,N-diethyl-3-acetamino-aniline | CH₃C(O)—NH—C₆H₂(Cl)(CN)—N=N—C₆H₃(NHCOCH₃)—N(CH₂CH₃)₂ | N-methyl-pyrrolidone | 120° | red |
| 39 | 3,5-dichloro-4-amino-acetanilide → N,N-diethyl-3-acetamino-aniline | CH₃C(O)—NH—C₆H(Cl)(Cl)(CN)—N=N—C₆H₃(NHCOCH₃)—N(CH₂CH₃)₂ | dimethylformamide | 40° | red |

EXAMPLE 5

6.5 Grams copper(I) cyanide are dissolved in 100 ml. N-methyl-pyrrolidone, 15 g. of the azo dyestuff 2,6-dibromo-4-nitroaniline→1-N,N-diethylamino-3-ethoxybenzene are introduced and the mixture is heated at 80°–90°, for about 3 hours while stirring. After cooling overnight, the reaction product which is precipitated in the form of dark crystals with a green-golden surface gloss, is filtered off with suction and recrystallised from dimethyl formamide/water (6:1), m.p. 236°–237°. The product dissolves in dimethyl formamide with a clear greenish blue colour and corresponds to the formula

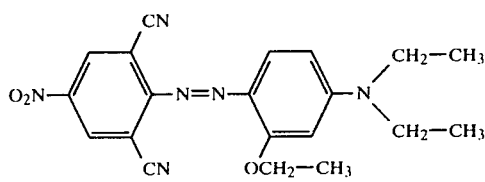

The product is free from halogen; the nitrile band is clearly recognisable in the infra-red spectrum, and determination of the molecular weight by mass spectroscopy yields the value 392 calculated for the above formula.

Analysis: ($C_{20}H_{20}N_6O_3$).
Calc: C,61.21, H,5.14; N,21.42; O, 12.23.
Found: C, 60.80; H,5.15; N,21.03; O,12.37.

EXAMPLE 6

A solution of 9.3 g. of the azo dyestuff, which is obtained by diazotising 2,6-dibromo-4-nitroaniline in concentrated sulphuric acid and coupling with N-methyl-N-(p-cyanoethyl)-aniline, in 100 ml. N-methyl-pyrrolidone is added to a mixture of 6.6 g. potassium cyanide and 20 g. copper (II) acetate monohydrate in 100 ml. N-methyl-pyrrolidone, and the reaction mixture is heated at 70°–80° for 3 hours while stirring. Already after heating for one hour, the starting dyestuff can no longer be detected in a chromatogram, but two other dyestuffs have been formed instead, one Bordeaux-coloured and one violet, the Bordeaux-coloured dyestuff being identical with the azo dyestuff 2-amino-3-bromo-8-nitro-1-cyanobenzene→ N-methyl-N-(p-cyanoethyl)-aniline.

After a further 3 hours, the Bordeaux-coloured component has disappeared and the colour of the solution has changed from the original red-brown to a clear violet. After cooling, the reaction product is precipitated by the addition of water, the precipitated copper(I) salts are dissolved by the addition of 10 g. potassium cyanide, and the dyestuff of the formula

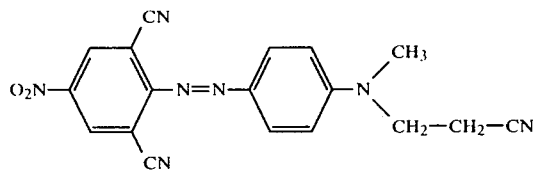

is filtered off. When dried, the dyestuff is a dark powder which dissolves in dimethyl formamide with a violet colour. The Beilstein test for halogen is negative.

EXAMPLE 7

7.7 Grams of the monoazo dyestuff obtained by diazotising 2,4,6-tribromo-aniline in concentrated sulphuric acid and coupling the diazo compound with 1-N,N-diethylamino-3-ethoxy-benzene are dissolved in 50 ml. N-methyl-pyrrolidone and, after the addition of a solution of 3.2 g. copper(I) cyanide in 30 ml. N-methyl-pyrrolidone, heated with stirring. The colour of the originally orange-yellow solution begins to change at 40° to 50° via red-brown to brown-red to give finally a clear Bordeaux at 90° to 100°. After a reaction time of 20 minutes at 100°, the starting dyestuff can no longer be detected in a thin layer chromatogram, and also the brown dyestuff which initially occurs at 40° to 50° and is presumably formed by the exchange of only one bromine atom for the nitrile group, has disappeared. After working up as described in the preceding Examples, a dyestuff is obtained, which dissolves in dimethyl formamide with a clear Bordeaux colour and presumably corresponds to the formula

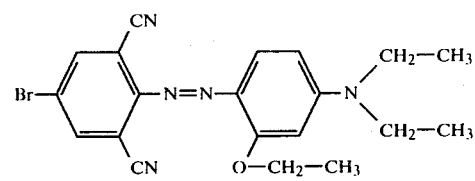

Determination of the molecular weight by mass spectroscopy yields the value 425 calculated for the above formula. The mass spectrum also proves that the compound is a monobromo compound.

EXAMPLE 8

7.45 Grams of the monoazo dyestuff obtained by diazotising 3,5-dibromo-4-amino-benzene-1-carboxylic acid methyl ester in concentrated sulphuric acid at 0° and coupling with 1-N,N-bis-(P-hydroxyethyl)-amino-3-methyl-benzene are dissolved in 50 ml. N-methyl-pyrrolidone and, after the addition of 3.2 g. copper(I) cyanide, heated with stirring. The reaction sets in at 40°, as can be recognized by the fact that the originally orange-coloured solution turns red-brown. When heating is continued at 100° C., the reaction is completed after about one hour. The colour of the solution is clear violet, the thin layer chromatogram shows a homogeneous violet dyestuff. The brown dyestuff, which initially occurs at the low temperature and is formed by the exchange of only one bromine atom for the nitrile group, has disappeared. The resultant reaction product is isolated as described in Example 6 and freed from the copper(I) salts. In the dry state, the dyestuff so obtained in a dark powder and dissolves in dimethyl formamide with a violet colour. It very probably has the constitution

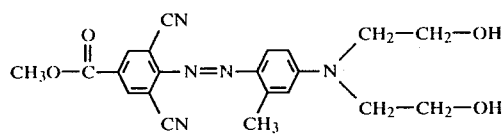

Further reactions of 2,6-dihalo-azo dyestuffs with copper(I) cyanide to give 2,6-dicyano products are compiled in the following Table.

| No. | Starting material | Reaction product | Solvent | Temperature | Colour of solution in dimethyl formamide |
|---|---|---|---|---|---|
| 1 | 2,6-dibromo-4-nitroaniline → N,N-diethyl-3-acetamino-aniline | $O_2N-\phantom{xx}-N=N-\phantom{xx}-N(CH_2-CH_3)_2$ with CN, CN substituents and NHCOCH$_3$ | dimethyl formamide | 40° | greenish blue |
| 2 | 2,6-dibromo-4-nitroaniline → N-ethyl-N-(β-carbomethoxyethyl)-3-acetamino-aniline | $O_2N-\phantom{xx}-N=N-\phantom{xx}-N(CH_2CH_3)(CH_2CH_2COOCH_3)$ with CN, CN and NHCOCH$_3$ | N-methyl pyrrolidone | 50° | blue |
| 3 | 2,6-dichloro-4-nitroaniline-N,N-diethyl-3-acetamino-aniline | $O_2N-\phantom{xx}-N=N-\phantom{xx}-N(CH_2CH_3)_2$ with CN, CN and NHCOCH$_3$ | N-methyl pyrrolidone | 100° | greenish blue |
| 4 | 3,5-dichloro-4-amino-benzene-sulphonic acid-N,N-dimethylamide → N-ethyl-N-(β-hydroxyethyl)-m-toluidine | $(CH_3)_2NSO_2-\phantom{xx}-N=N-\phantom{xx}-N(CH_2CH_3)(CH_2CH_2OH)$ with CN, CN and CH$_3$ | N-methyl pyrrolidone | 160° | Bordeaux |
| 5 | 3,5-dibromo-4-amino-benzene-sulphonic acid-N,N-dimethylamide → N,N-diethyl-amino-3-ethoxybenzene | $(CH_3)_2NSO_2-\phantom{xx}-N=N-\phantom{xx}-N(CH_2CH_3)_2$ with CN, CN and OCH$_2$-CH$_3$ | N-methyl pyrrolidone | 80° | Bordeaux |
| 6 | 2,6-dibromo-4-nitroaniline → N-(β-trimethyl-ammoniumethyl)-1,2,3,4-tetrahydroquinoline chloride | $O_2N-\phantom{xx}-N=N-\phantom{xx}$-tetrahydroquinoline-N-CH$_2$-CH$_2$-N(CH$_3$)$_3$ Cl$^\ominus$ with CN, CN | N-methyl pyrrolidone | 90° | blue-violet |
| 7 | 2,6-dibromo-4-nitroaniline → N-(β-dimethylaminoethyl)-1,2,3,4-tetrahydro-quinoline | $O_2N-\phantom{xx}-N=N-\phantom{xx}$-tetrahydroquinoline-N-CH$_2$-CH$_2$-N(CH$_3$)$_2$ with CN, CN | N-methyl pyrrolidone | 50° | reddish blue |
| 8 | 2,6-dibromo-4-nitroaniline → N-(β-hydroxyethyl)-N-(β-cyanoethyl)-aniline | $O_2N-\phantom{xx}-N=N-\phantom{xx}-N(CH_2CH_2OH)_2$ with CN, CN | N-methyl pyrrolidone | 50° | violet |
| 9 | 3,5-dibromo-4-amino-benzoic acid methyl ester → N,N-di-ethyl-amino-3-ethoxybenzene | $CH_3OOC-\phantom{xx}-N=N-\phantom{xx}-N(CH_2CH_3)_2$ with CN, CN and O-CH$_2$-CH$_3$ | N-methyl pyrrolidone | 60° | violet |
| 10 | 2,6-dibromo-4-nitroaniline → N-ethyl-N-(β-dimethylaminoethyl)-m-toluidine | $O_2N-\phantom{xx}-N=N-\phantom{xx}-N(CH_2CH_3)(CH_2CH_2N(CH_3)_2)$ with CN, CN and CH$_3$ | N-methyl pyrrolidone | 100° | blue-violet |

-continued

| No. | Starting material | Reaction product | Solvent | Temperature | Colour of solution in dimethyl formamide |
|---|---|---|---|---|---|
| 11 | 3,5-dibromo-4-aminobenzonitrile → N,N-bis-(β-hydroxyethyl)-2-ethoxy-5-acetamino-aniline | NC–C₆H(CN)₂–N=N–C₆H₂(OCH₂CH₃)(NHCOCH₃)–N(CH₂CH₂OH)₂ | dimethyl sulphoxide | 25° | greenish blue |
| 12 | 2,6-dibromo-4-nitroaniline → N-ethyl-N-(β-hydroxyethyl)-m-toluidine | O₂N–C₆H(CN)₂–N=N–C₆H₂(CH₃)–N(CH₂CH₃)(CH₂CH₂OH) | phosphoric acid tris-dimethylamide | 100° | blue |
| 13 | 2,6-dibromo-4-nitroaniline → N-(β-cyanoethyl)-N-(β-carbomethoxyethyl)-aniline | O₂N–C₆H(CN)₂–N=N–C₆H₄–N(CH₂CH₂CN)(CH₂CH₂COOCH₃) | dimethyl formamide | 50° | Bordeaux |
| 14 | 2,6-dibromo-4-nitroaniline → N-ethyl-N-(β-hydroxyethyl)-aniline | O₂N–C₆H(CN)₂–N=N–C₆H₄–N(CH₂CH₃)(CH₂CH₂OH) | dimethyl formamide | 70° | blue |
| 15 | 2,6-dibromo-4-nitroaniline → N,N-bis-(β-hydroxyethyl)-aniline | O₂N–C₆H(CN)₂–N=N–C₆H₄–N(CH₂CH₂OH)₂ | dimethyl sulphoxide | 50° | blue |
| 16 | (3,5-dibromo-4-amino-phenyl)-methylsulphone → N-ethyl-N-(β-hydroxyethyl)-aniline | CH₃–SO₂–C₆H(CN)₂–N=N–C₆H₄–N(CH₂CH₃)(CH₂CH₂OH) | N-methyl pyrrolidone | 80° | ruby |
| 17 | (3,5-dibromo-4-aminophenyl)-methylsulphone → N-methyl-N-(β-cyanoethyl)- | CH₃–SO₂–C₆H(CN)₂–N=N–C₆H₄–N(CH₃)(CH₂CH₂CN) | N-methyl pyrrolidone | 80° | red |
| 18 | 3,5-dibromo-4-aminobenzonitrile → N-ethyl-N-(β-carbomethoxyethyl)-3-acetaminoaniline | NC–C₆H(CN)₂–N=N–C₆H₂(NHCOCH₃)–N(CH₂CH₃)(CH₂CH₂COOCH₃) | N-methyl pyrrolidone | 50° | blue-violet |
| 19 | 3,5-dibromo-4-aminobenzonitrile → N-(β-cyanoethyl)-N-(β-carbomethoxyethyl)-aniline | NC–C₆H(CN)₂–N=N–C₆H₄–N(CH₂CH₂CN)(CH₂CH₂COOCH₃) | N-methyl pyrrolidone | 60° | red |
| 20 | 3,5-dibromo-4-aminobenzonitrile → N-ethyl-N-(β-hydroxyethyl)-m-toluidine | NC–C₆H(CN)₂–N=N–C₆H₂(CH₃)–N(CH₂CH₃)(CH₂CH₂OH) | N-methyl pyrrolidone | 100° | reddish blue |
| 21 | 3,5-dibromo-4-aminobenzoic acid → N,N-diethyl-3-ethoxy-aniline | HOOC–C₆H(CN)₂–N=N–C₆H₂(OCH₂CH₃)–N(CH₂CH₃)₂ | N-methyl pyrrolidone | 100° | Bordeaux |
| 22 | 3,5-dibromo-4-aminobenzoic acid → N,N-di(β-hydroxyethyl)-aniline | HOOC–C₆H(CN)₂–N=N–C₆H₄–N(CH₂CH₂OH)₂ | N-methyl pyrrolidone | 100° | Bordeaux |

-continued

| No. | Starting material | Reaction product | Solvent | Temperature | Colour of solution in dimethyl formamide |
|---|---|---|---|---|---|
| 23 | 2,6-dibromo-aniline → N,N-diethyl-3-ethoxy-aniline | [structure: 2,6-dicyanophenyl-N=N-(3-ethoxy-4-(N,N-diethylamino))phenyl] | N-methyl pyrrolidone | 100° | red |
| 24 | 3,5-dibromo-4-amino-toluene → N,N-diethyl-3-acetamino-aniline | [structure with CH₃, two CN, NHCOCH₃, N(CH₂CH₃)₂] | N-methyl pyrrolidone | 40° | red |
| 25 | 3,5-dibromo-4-amino-anisole → N,N-diethyl-3-acetamino-aniline | [structure with CH₃O, two CN, NHCOCH₃, N(CH₂CH₃)₂] | N-methyl pyrrolidone | 50° | red |
| 26 | 3,5-dibromo-4-amino-1-cyano-benzene → 2-phenyl-indole | [structure: NC–(CN)₂-phenyl–N=N–2-phenyl-indole, C₆H₅, NH] | N-methyl pyrrolidone | 120° | red |
| 27 | 2,6-dibromoaniline → N-butyl-N-(β-hydroxyethyl)-m-toluidine | [structure with two CN, CH₃, N(CH₂CH₂CH₂CH₃)(CH₂CH₂OH)] | dimethyl formamide | 90° | red |
| 28 | 2,6-dibromoaniline → N-ethyl-N-(β-carbomethoxyethyl)-3-acetamino-aniline | [structure with two CN, NHCOCH₃, N(CH₂CH₃)(CH₂CH₂COOCH₃)] | dimethyl formamide | 50° | pink |
| 29 | 2,6-dibromo-4-chloro-aniline → N-butyl-N-(β-acetoxyethyl)-aniline | [structure: Cl-(CN)₂-phenyl-N=N-phenyl-N(CH₂CH₂CH₂CH₃)(CH₂CH₂OC(O)CH₃)] | dimethyl formamide | 60° | red |
| 30 | 2,6-dibromo-4-chloro-aniline → N-butyl-N-(β-hydroxyethyl)-m-toluidine | [structure: Cl-(CN)₂-phenyl-N=N-(3-methyl)phenyl-N(C₄H₉)(CH₂CH₂OH)] | dimethyl formamide | 90° | red |
| 31 | 2,6-dibromo-4-chloro-aniline → N-ethyl-N-(β-carbomethoxyethyl)-3-acetamino-aniline | [structure: Cl-(CN)₂-phenyl-N=N-phenyl with NHCOCH₃, N(CH₂CH₃)(CH₂CH₂COOCH₃)] | dimethyl formamide | 30° | ruby |
| 32 | 2,4,6-tribromoaniline → N-butyl-N-(β-acetoxyethyl)-m-toluidine | [structure: Br-(CN)₂-phenyl-N=N-(3-methyl)phenyl-N(C₄H₉)(CH₂CH₂OC(O)CH₃)] | dimethyl formamide | 90° | red |
| 33 | 2,4,6-tribromoaniline → N-ethyl-N-(β-carbomethoxyethyl)-3-acetamino-aniline | [structure: Br-(CN)₂-phenyl-N=N-phenyl with NHCOCH₃, N(CH₂CH₃)(CH₂CH₂COOCH₃)] | dimethyl formamide | 30° | ruby |

-continued

| No. | Starting material | Reaction product | Solvent | Temperature | Colour of solution in dimethyl formamide |
|---|---|---|---|---|---|
| 34 | 3,5-dibromo-4-amino-anisol → N-butyl-N-(β-hydroxyethyl)m-toluidine | $CH_3O\text{-}Ar(CN)_2\text{-}N=N\text{-}Ar(CH_3)\text{-}N(CH_2CH_2CH_2CH_3)(CH_2CH_2OH)$ | dimethyl formamide | 90° | red |
| 35 | 3,5-dibromo-4-amino-acetophenone → N-ethyl-N-(β-hydroxyethyl)aniline | $CH_3CO\text{-}Ar(CN)_2\text{-}N=N\text{-}Ar\text{-}N(CH_2CH_3)(CH_2CH_2OH)$ | dimethyl formamide | 60° | ruby |
| 36 | 3,5-dibromo-4-amino-acetophenone → N-butyl)-N-(β-hydroxyethyl)m-toluidine | $CH_3CO\text{-}Ar(CN)_2\text{-}N=N\text{-}Ar(CH_3)\text{-}N(CH_2CH_2CH_2CH_3)(CH_2CH_2OH)$ | dimethyl formamide | 90° | red-violet |
| 37 | 3,5-dibromo-4-amino-acetophenone → N-ethyl-N-(β-carbomethoxyethyl)-3-acetamino-aniline | $CH_3CO\text{-}Ar(CN)_2\text{-}N=N\text{-}Ar(NHCOCH_3)\text{-}N(CH_2CH_3)(CH_2CH_2COOCH_3)$ | dimethyl formamide | 30° | violet |
| 38 | 3,5-dibromo-4-amino-benzophenone → N-ethyl-N-(β-hydroxyethyl)-aniline | $Ph\text{-}CO\text{-}Ar(CN)_2\text{-}N=N\text{-}Ar\text{-}N(CH_2CH_3)(CH_2CH_2OH)$ | dimethyl formamide | 60° | ruby |
| 39 | 3,5-dibromo-4-amino-benzophenone → N-ethyl-N-(β-hydroxyethyl)-m-toluidine | $Ph\text{-}CO\text{-}Ar(CN)_2\text{-}N=N\text{-}Ar(CH_3)\text{-}N(CH_2CH_3)(CH_2CH_2OH)$ | dimethyl formamide | 90° | red-violet |
| 40 | 3,5-dibromo-4-amino-benzophenone → N-ethyl-N-(β-carbomethoxyethyl)-3-acetamino-aniline | $Ph\text{-}CO\text{-}Ar(CN)_2\text{-}N=N\text{-}Ar(NHCOCH_3)\text{-}N(CH_2CH_3)(CH_2CH_2COOCH_3)$ | dimethyl formamide | 50° | violet |
| 41 | 3,5-dibromo-4-amino-benzonitrile → N-butyl-N-(β-methoxycarbonyl-oxyethyl)-m-toluidin | $NC\text{-}Ar(CN)_2\text{-}N=N\text{-}Ar(CH_3)\text{-}N(CH_2CH_2CH_2CH_3)(CH_2CH_2OCOOCH_3)$ | dimethyl formamide | 90° | red-violet |
| 42 | 3,5-dibromo-4-amino-benzonitrile → N,N-bis-(β-methoxycarbonyl-oxyethyl)-aniline | $NC\text{-}Ar(CN)_2\text{-}N=N\text{-}Ar\text{-}N(CH_2CH_2OCOOCH_3)_2$ | dimethyl sulphoxide | 70° | red |
| 43 | 3-bromo-5-chloro-4-amino-benzotrifluoride → N,N-bis-(β-hydroxyethyl)-3-acetamino-aniline | $F_3C\text{-}Ar(CN)_2\text{-}N=N\text{-}Ar(NHCOCH_3)\text{-}N(CH_2CH_2OH)_2$ | N-methyl-pyrrolidone | 100° | red-violet |
| 44 | 3,5-dibromo-4-amino-toluene → N-ethyl-N-(β-hydroxyethyl)-m-toluidine | $H_3C\text{-}Ar(CN)_2\text{-}N=N\text{-}Ar(CH_3)\text{-}N(CH_2CH_3)(CH_2CH_2OH)$ | N-methyl-pyrrolidone | 80° | red |
| 45 | 3,5-dibromo-4-amino-toluene → N-(β-hydroxyethyl)-3-acetamino-aniline | $H_3C\text{-}Ar(CN)_2\text{-}N=N\text{-}Ar(CH_3)(NHCOCH_3)\text{-}NH(CH_2CH_2OH)$ | dimethyl formamide | 50° | bluish red |

-continued

| No. | Starting material | Reaction product | Solvent | Temperature | Colour of solution in dimethyl formamide |
|---|---|---|---|---|---|
| 46 | 3,5-dibromo-4-amino-toluene → N,N-bis-(β-hydroxyethyl)-3-acetamino-aniline | H₃C—⟨CN,CN⟩—N=N—⟨NHCOCH₃⟩—N(CH₂CH₂OH)(CH₂CH₂OH) | N-methyl-pyrrolidone | 40° | bluish-red |
| 47 | 3,5-dibromo-4-amino-toluene → N-butyl-N-(β-hydroxyethyl)-aniline | H₃C—⟨CN,CN⟩—N=N—⟨⟩—N(CH₂CH₂CH₂CH₃)(CH₂CH₂OH) | N-methyl-pyrrolidone | 70° | yellowish red |
| 48 | 3,5-dibromo-4-amino-toluol → N-ethyl-N-(β-carbomethoxyethyl)-m-acetamino-aniline | H₃C—⟨CN,CN⟩—N=N—⟨NHCOCH₃⟩—N(CH₂CH₃)(CH₂CH₂COOCH₃) | N-methyl-pyrrolidone | 50° | ruby |
| 49 | 3,5-dibromo-4-amino-benzoic acidmethylester → N,N-bis-(β-methoxycarbonyloxyethyl)-aniline | CH₃OOC—⟨CN,CN⟩—N=N—⟨⟩—N(CH₂CH₂OCOOCH₃)(CH₂CH₂OCOOCH₃) | N-methyl-pyrrolidone | 50° | bluish red |
| 50 | 3,5-dibromo-4-amino-benzoic acidmethylester → N-ethyl-N-(β-acetoxyethyl)-m-toluidine | CH₃OOC—⟨CN,CN⟩—N=N—⟨⟩—N(CH₂CH₃)(CH₂CH₂OCOCH₃) | N-methyl-pyrrolidone | 90° | violet |
| 51 | 3,5-dibromo-4-amino-benzoic acidmethylester → N-ethyl-N-(β-carbomethoxyethyl)-acetamino-aniline | CH₃OOC—⟨CN,CN⟩—N=N—⟨NHCOCH₃⟩—N(CH₂CH₃)(CH₂CH₂COOCH₃) | N-methyl-pyrrolidone | 60° | violet |
| 52 | 3,5-dibromo-4-amino-toluene → N-(β-hydroxyethyl)-napthylamin-(1) | CH₃—⟨CN,CN⟩—N=N—⟨naphthyl⟩—NHCH₂CH₂OH | N-methyl-pyrrolidone | 70° | ruby |
| 53 | 3,5-dibromo-4-amino-acetanilide → N-butyl-N-(β-hydroxyethyl)-m-toluidine | CH₃C(=O)NH—⟨CN,CN⟩—N=N—⟨CH₃⟩—N(CH₂CH₂CH₂CH₃)(CH₂CH₂OH) | dimethyl formamide | 90° | red |
| 54 | 3,5-dibromo-4-amino-acetanilide → N,N-diethyl-aniline | CH₃C(=O)NH—⟨CN,CN⟩—N=N—⟨⟩—N(CH₂CH₃)(CH₂CH₃) | dimethyl formamide | 60° | red |
| 55 | 3,5-dibromo-4-amino-acetanilide → N-ethyl-N-(β-hydroxyethyl)-m-toluidine | CH₃C(=O)NH—⟨CN,CN⟩—N=N—⟨CH₃⟩—N(CH₂CH₃)(CH₂CH₂OH) | dimethyl formamide | 90° | red |
| 56 | 3,5-dibromo-4-amino-acetanilide → N,N-diethyl-acetamino-aniline | CH₃C(=O)NH—⟨CN,CN⟩—N=N—⟨NHCOCH₃⟩—N(CH₂CH₃)(CH₂CH₃) | dimethyl formamide | 40° | ruby |

EXAMPLE 9

23 Grams of the monoazo dyestuff 2,6-dibromo-4-nitraniline→N-ethyl-N-(β-carbomethoxyethyl)-3-acetaminoaniline, 8,6 g copper (I) cyanide and 7.8 ml. pyridine are heated for 2 hours while stirring in 100 ml nitrobenzene at a temperature of 90°–100° C. The solvent is distilled off under vaccuum. The remaining residue is introduced at 0°–5° C. into a solution of 20 g sodium cyanide in 150 ml. water. After stirring for a short time, the precipitate is filtered off with suction, a dyestuff of the formula

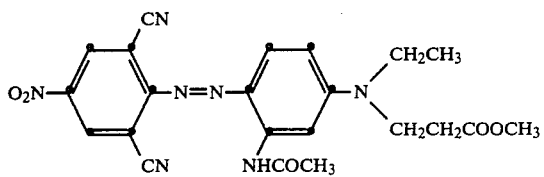

is then obtained. The resulting dyestuff is a dark powder, which is soluble in dimethyl formamide with a blue colour.

EXAMPLE 10

0.1 Gram of the well dispersed dyestuff of the formula

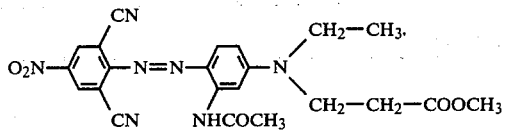

is introduced at 40°–50° C. into 1 liter of water which also contains 0.1–0.2 g. of a sulphite cellulose decomposition product and 0.3–0.5 g. dichlorobenzene. 10 Grams of a fabric made of polyethylene terephthalate are introduced into this bath, the temperature of the dyebath is raised to 100° C. within about 20 minutes and dyeing is carried out at this temperature for about 60 to 90 minutes. A strongly reddish blue dyeing of good fastness to wet processing, sublimation and light is thus obtained.

If in the present Example the substrate is replaced with 10 g. of a fabric made of cellulose triacetate, then a clear reddish blue dyeing of good general fastness properties is obtained.

Under the dyeing conditions of the present Example the dyestuffs mentioned in the following Table yield the stated shades on polyester fibres:

TABLE

| Dyestuff | Shade on polyethylene terephthalate |
|---|---|
| ![structure] O₂N—[ring with CN, CN]—N=N—[ring with NHCOCH₃]—N(CH₂CH₃)(CH₂CH₃) | blue |
| ![structure] O₂N—[ring with CN, CN]—N=N—[ring with O—CH₂—CH₃]—N(CH₂—CH₃)(CH₂—CH₃) | bluish violet |
| ![structure] O₂N—[ring with CN, CN]—N=N—[ring]—N(CH₃)(CH₂—CH₂—CN) | Bordeaux |
| ![structure] O₂N—[ring with CN, CN]—N=N—[ring]—N(CH₂—CH₂—OH)(CH₂—CH₂—CN) | " |
| ![structure] O₂N—[ring with CN, CN]—N=N—[ring]—N(CH₂—CH₃)(CH₂—CH₂—OCOCH₃) | blue-violet |
| ![structure] O₂N—[ring with CN, CN]—N=N—[ring with CH₃]—N(CH₂—CH₃)(CH₂—CH₂—OH) | blue |

TABLE-continued
| Dyestuff | Shade on polyethylene terephthalate |
|---|---|
| 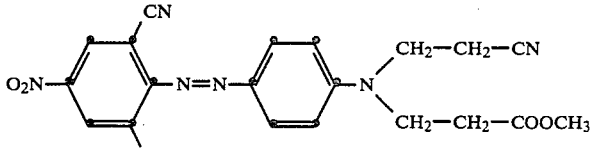 | red |
| 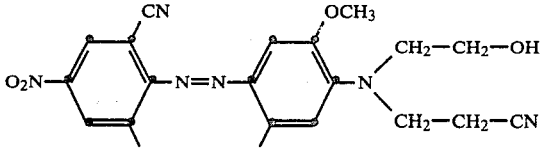 | greenish blue |
| 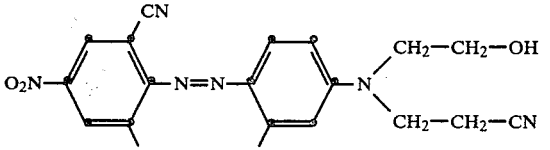 | violet |
| 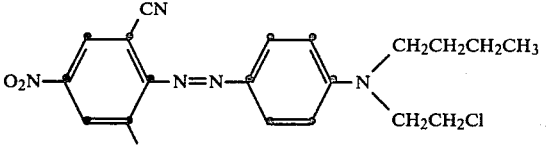 | bluish violet |
| 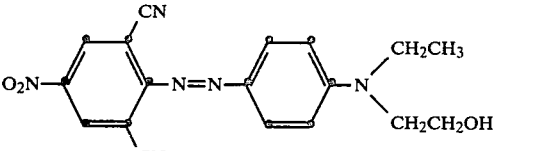 | bluish violet |
| 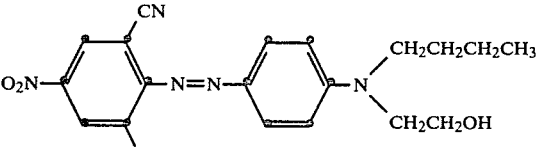 | bluish violet |
| 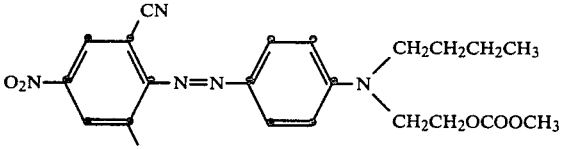 | bluish violet |
| 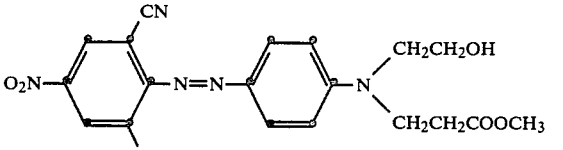 | violet |
| 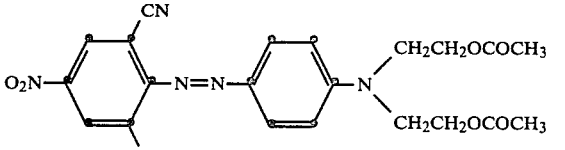 | reddish violet |
| 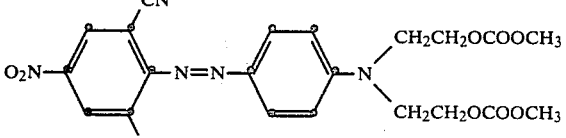 | reddish violet |

TABLE-continued
| Dyestuff | Shade on polyethylene terephthalate |
|---|---|
| 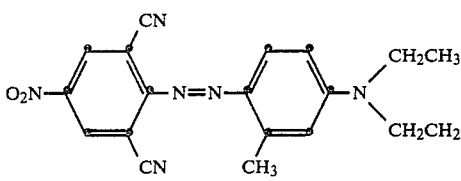 | bluish violet |
| 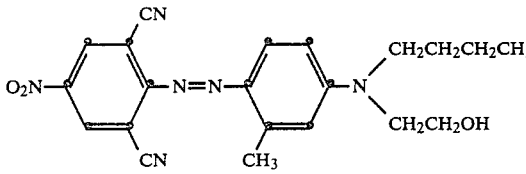 | bluish violet |
| 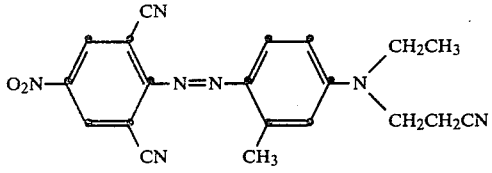 | bluish violet |
| 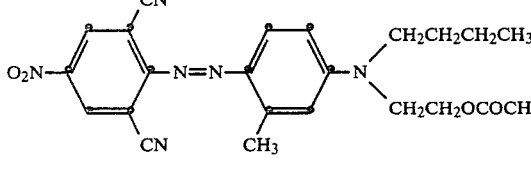 | bluish violet |
| 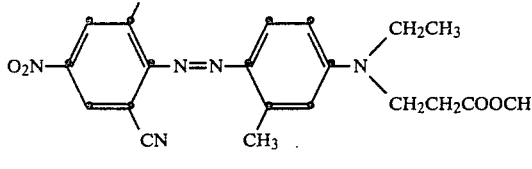 | bluish violet |
| 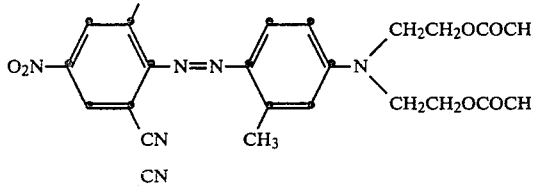 | bluish violet |
| 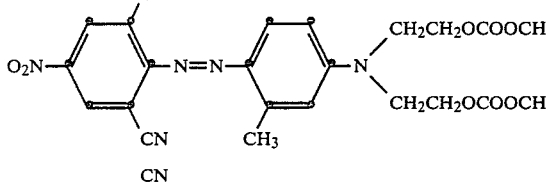 | bluish violet |
| 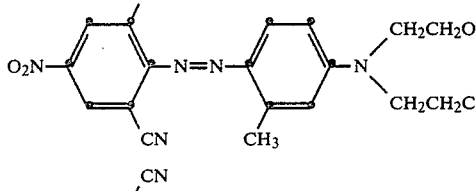 | violet |
| 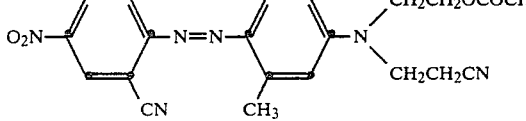 | reddish violet |

TABLE-continued
| Dyestuff | Shade on polyethylene terephthalate |
|---|---|
| 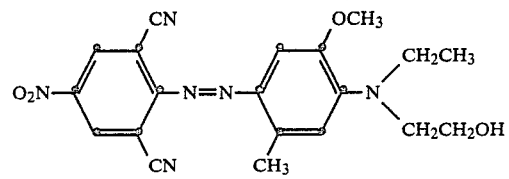 | reddish blue |
| 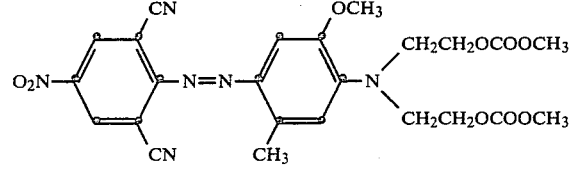 | reddish blue |
| 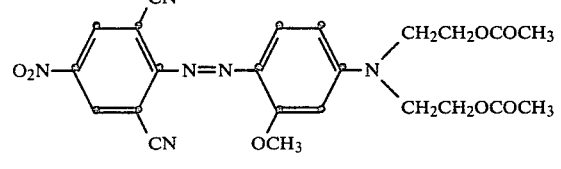 | violet |
| 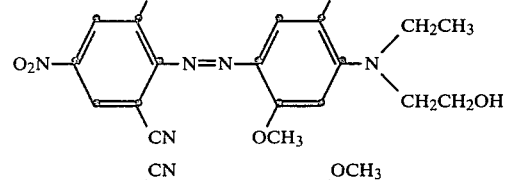 | blue |
| 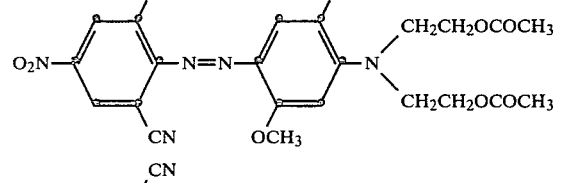 | reddish blue |
| 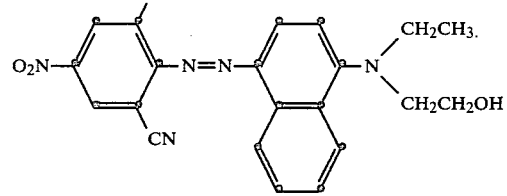 | greenish blue |
| 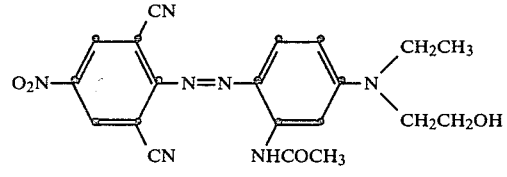 | blue |
| 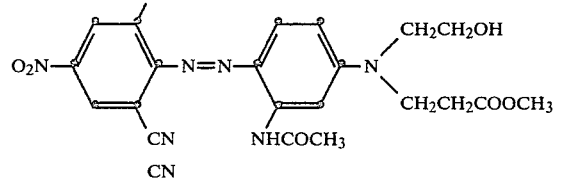 | blue |
|  | blue |

TABLE-continued
| Dyestuff | Shade on polyethylene terephthalate |
|---|---|
| 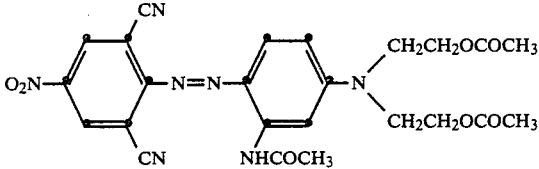 | reddish blue |
| 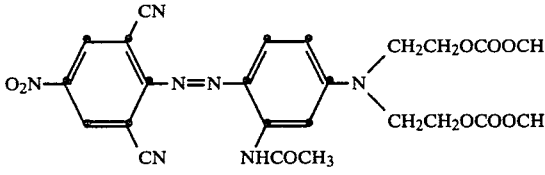 | reddish blue |
| 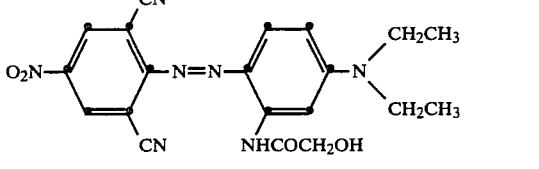 | blue |
| 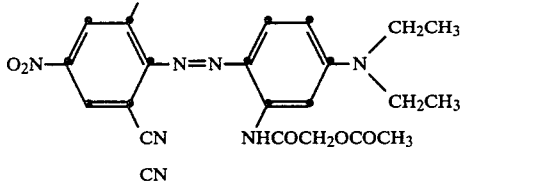 | blue |
|  | blue |
|  | blue |
|  | blue |
| 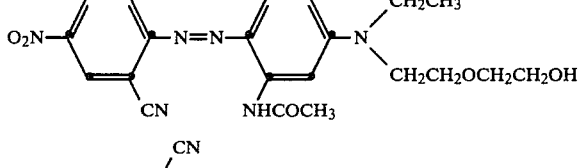 | blue |
| 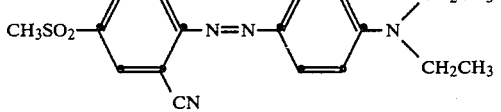 | red-violet |

TABLE-continued
| Dyestuff | Shade on polyethylene terephthalate |
|---|---|
| 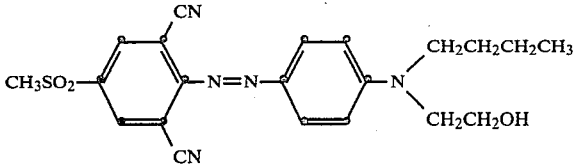 | red-violet |
| 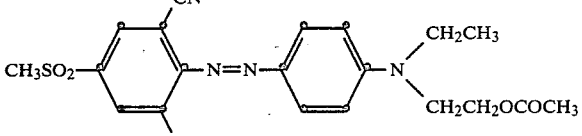 | red-violet |
| 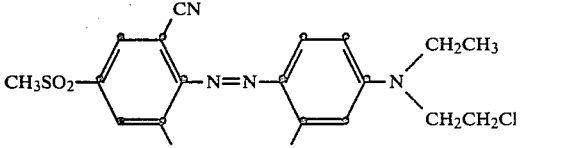 | reddish violet |
| 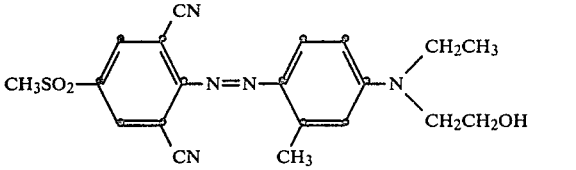 | violet |
| 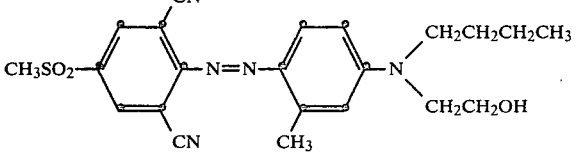 | violet |
| 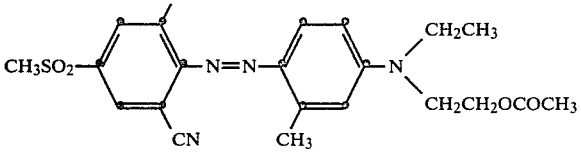 | reddish violet |
| 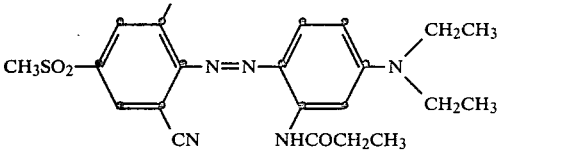 | violet |
| 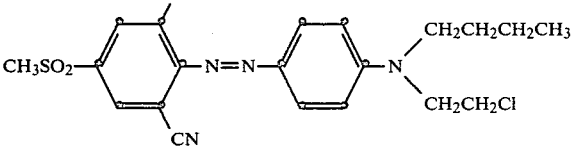 | red-violet |
| 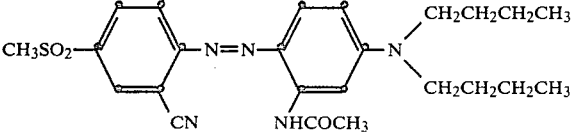 | violet |

TABLE-continued
| Dyestuff | Shade on polyethylene terephthalate |
|---|---|
| 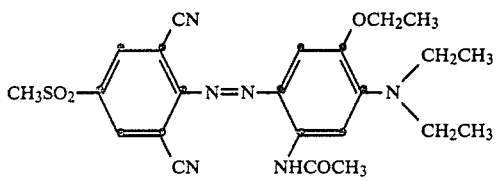 | blue |
| 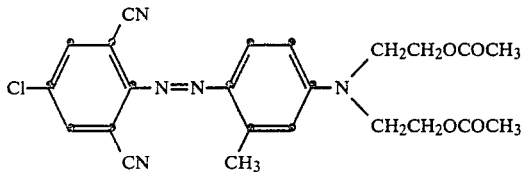 | red |
| 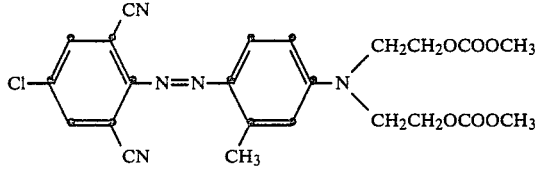 | red |
| 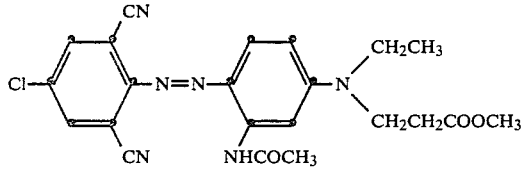 | ruby |
| 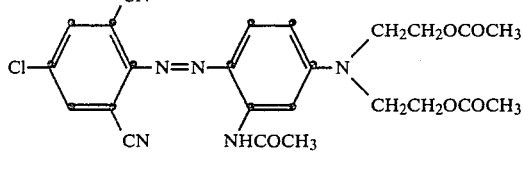 | ruby |
| 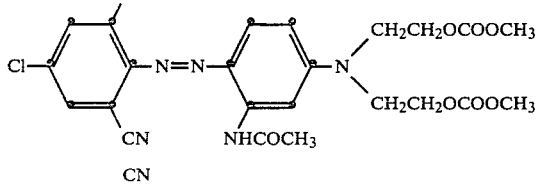 | ruby |
| 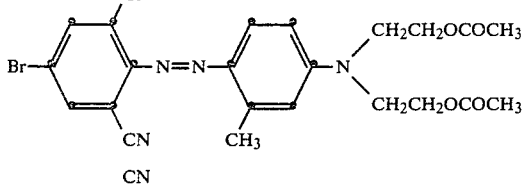 | red |
| 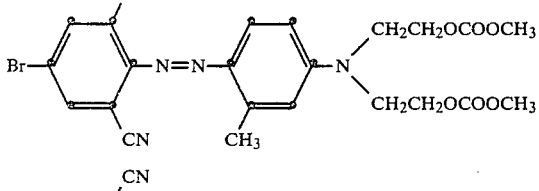 | red |
| 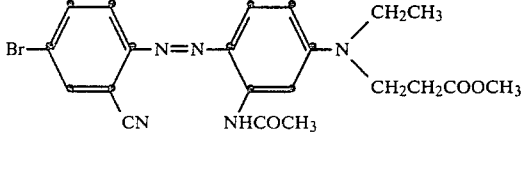 | ruby |

TABLE-continued
| Dyestuff | Shade on polyethylene terephthalate |
|---|---|
| 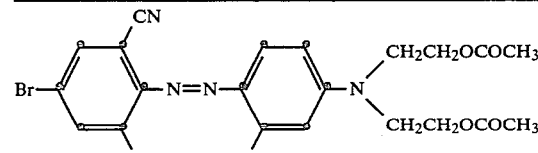 | ruby |
| 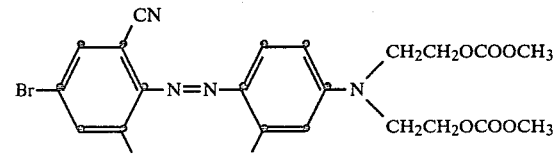 | ruby |
| 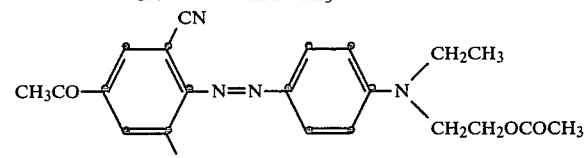 | ruby |
| 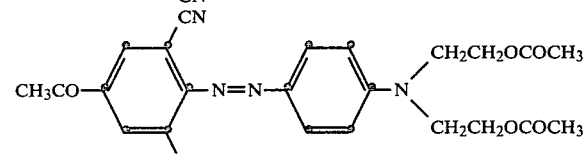 | bordeaux |
| 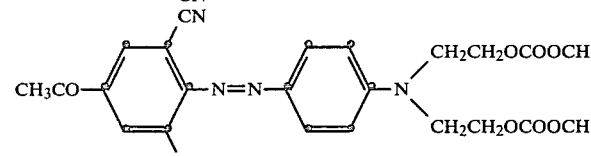 | bordeaux |
| 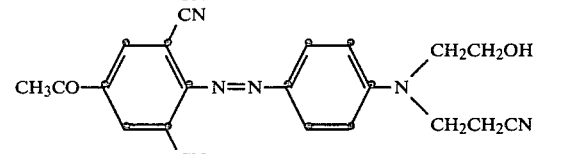 | bordeaux |
| 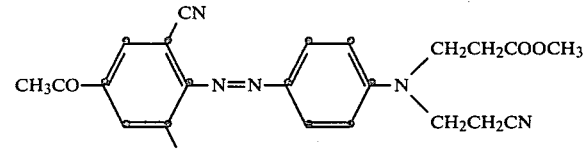 | bordeaux |
| 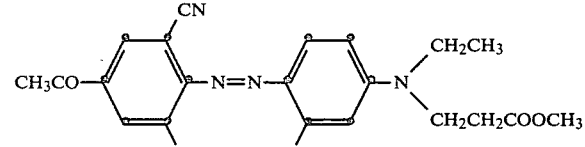 | violet |
| 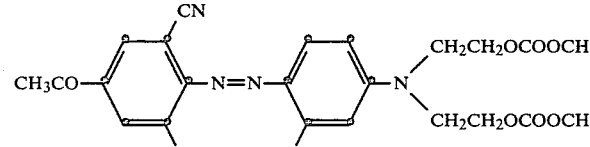 | red-violet |
| 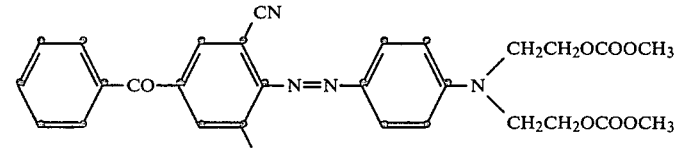 | bordeaux |

TABLE-continued

| Dyestuff | Shade on polyethylene terephthalate |
|---|---|
| 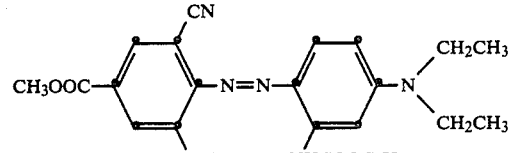 | reddish violet |
| 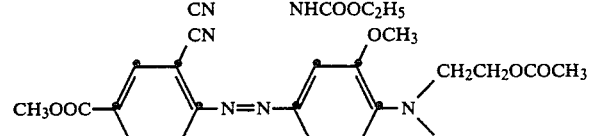 | red-violet |
| 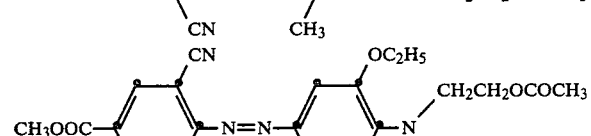 | red-violet |
| 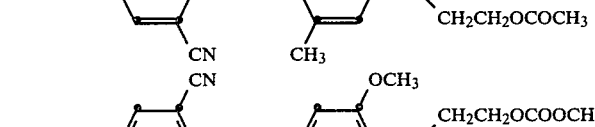 | red-violet |
| 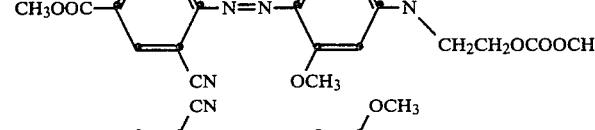 | blue |
| 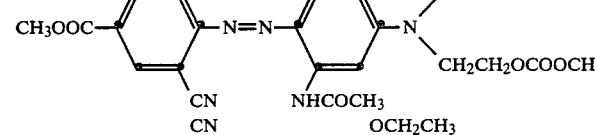 | blue |

EXAMPLE 11

0.5 Grams of the dyestuff of the formula

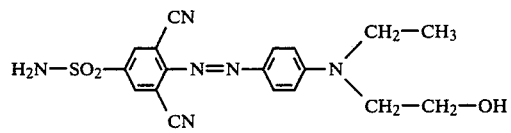

are introduced in wel dispersed form at 40°–50° C. into 1 liter of water which also contains 0.5–1 g. polyethylene glycol. 25 Grams of synthetic superpolyamide yarn are introduced into this bath, the temperature is raised to 95°–100° C. within about 20 minutes and dyeing is carried out for about 1 hour. An intense Bordenux dyeing of good fastness to wet processing and light is obtained.

The dyestuffs compiled in Table 2 dye synthetic superpolyamide fibres in the stated shades:

TABLE

| Dyestuff | Shade |
|---|---|
| 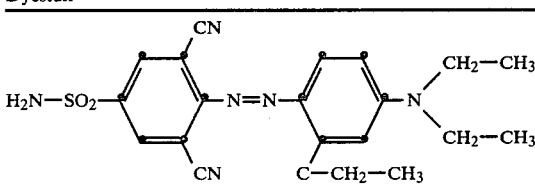 | red-violet |

TABLE-continued
| Dyestuff | Shade |
|---|---|
| 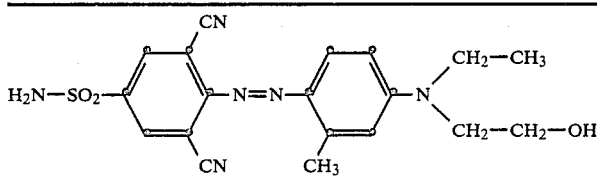 | red-violet |
| 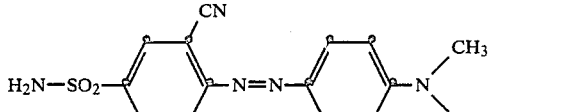 | red |
|  | red-violet |
| 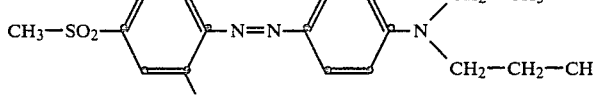 | red |
|  | blue-violet |
|  | blue |
| 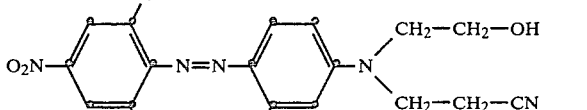 | red |
| 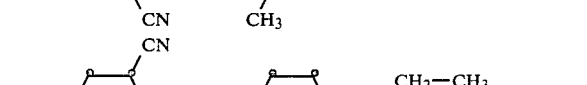 | red |
| 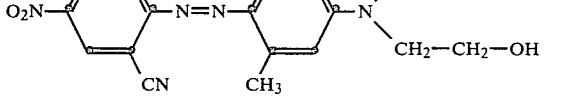 | red |
| 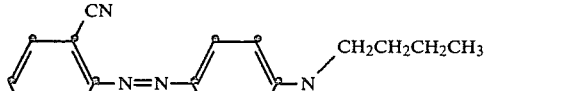 | bordeaux |

TABLE-continued
| Dyestuff | Shade on polyethylene terephthalate |
|---|---|
| 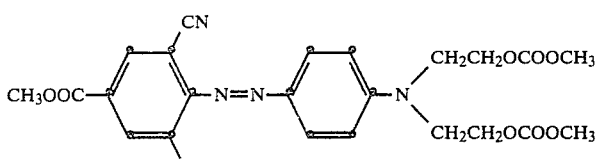 | bluish red |
| 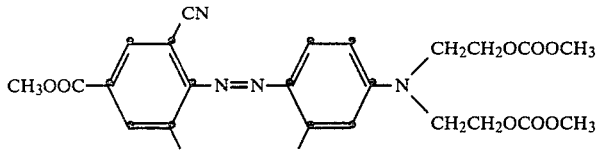 | red-violet |
| 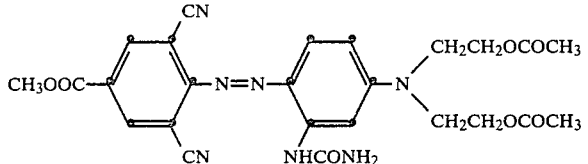 | red-violet |
| 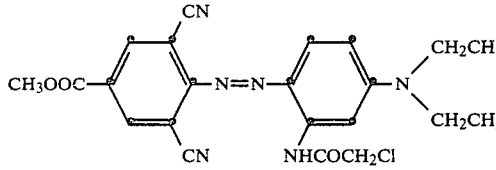 | violet |
|  | reddish violet |
|  | blue |
| 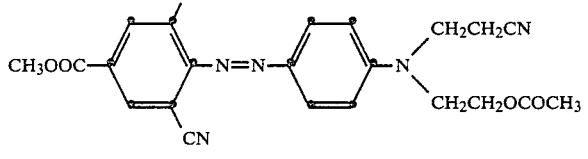 | red |
| 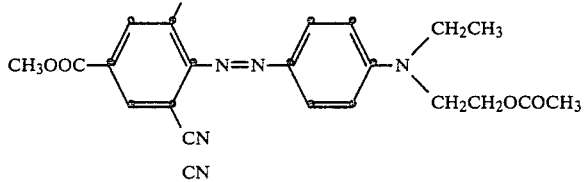 | ruby |
| 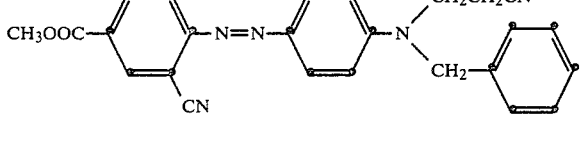 | red |

TABLE-continued

| Dyestuff | Shade on polyethylene terephthalate |
|---|---|
| CH₃OOC–[benzene with CN, CN]–N=N–[benzene]–N(CH₂CH₂CH₂CH₃)(CH₂CH₂CN) | bluish red |
| CH₃OOC–[benzene with CN, CN]–N=N–[benzene]–N(CH₂CH₂CN)(CH₂CH₂COOCH₃) | red |
| CH₃OOC–[benzene with CN, CN]–N=N–[benzene]–N(CH₂CH₂OH)(CH₂CH₂CN) | bluish red |
| CH₃OOC–[benzene with CN, CN]–N=N–[benzene]–N(CH₂CH₃)(CH₂CH₂CN) | bluish red |
| CH₃–[benzene with CN, CN]–N=N–[benzene with NHCOCH₃]–N(CH₂CH₃)(CH₂CH₂COOCH₃) | bluish red |
| CH₃–[benzene with CN, CN]–N=N–[benzene with CH₃, NHCOCH₃]–N(H)(CH₂CH₂OH) | pink |
| CH₃–[benzene with CN, CN]–N=N–[benzene with NHCOCH₃]–N(CH₂CH₂CH₃)(CH₂CH₂COOCH₃) | bluish red |
| CH₃–[benzene with CN, CN]–N=N–[benzene]–N(CH₂CH₂CN)(CH₂CH₂COOCH₃) | yellowish orange |
| CH₃OOC–[benzene with CN, CN]–N=N–[benzene with NHCOCH₃]–N(CH₂CH₃)(CH₂CH₃) | violet |

TABLE-continued
| Dyestuff | Shade |
|---|---|
| 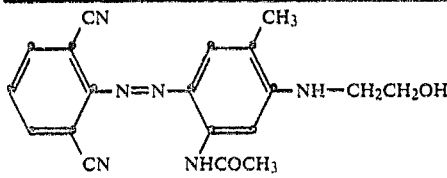 | ruby |
| 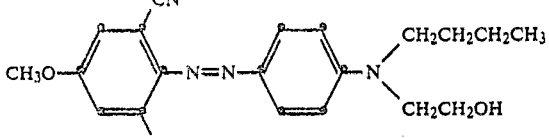 | red-orange |
| 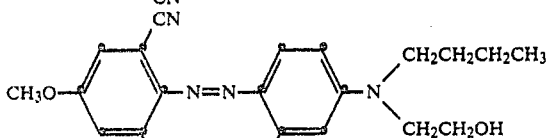 | red |
| 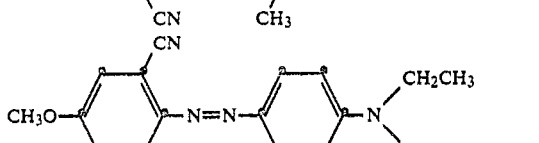 | scarlet |
| 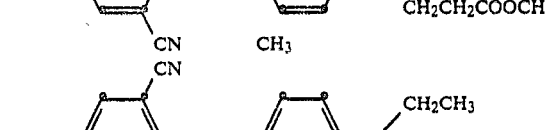 | scarlet |
| 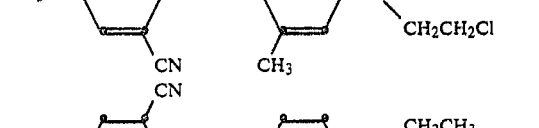 | bordeaux |
| 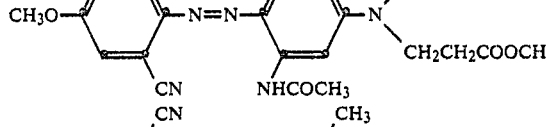 | bordeaux |
| 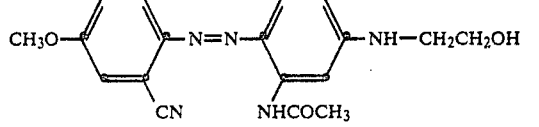 | ruby |
| 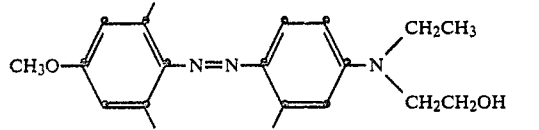 | ruby |
| 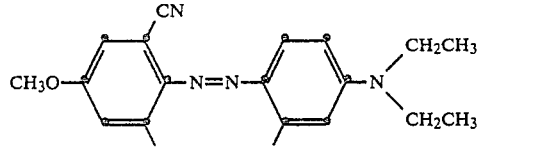 | red |
| 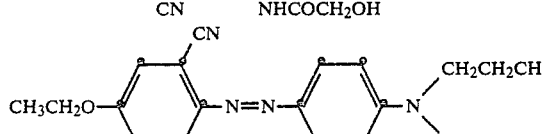 | |

TABLE-continued
| Dyestuff | Shade |
|---|---|
| 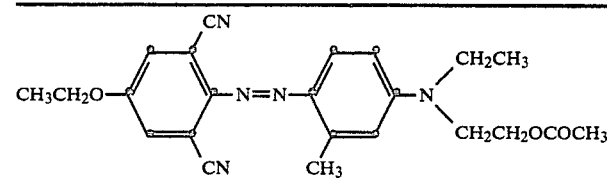 | scarlet |
| 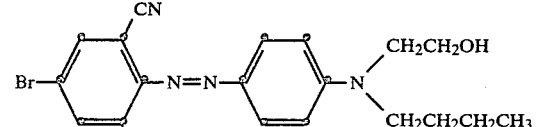 | bluish red |
| 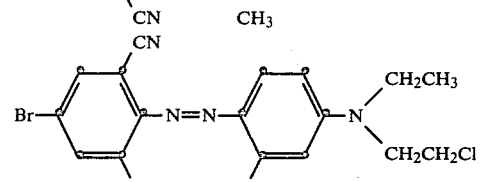 | bluish red |
| 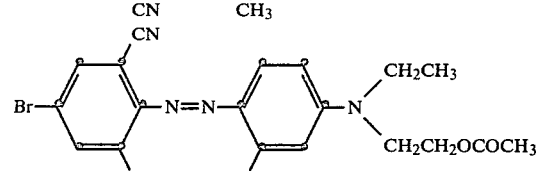 | bluish red |
| 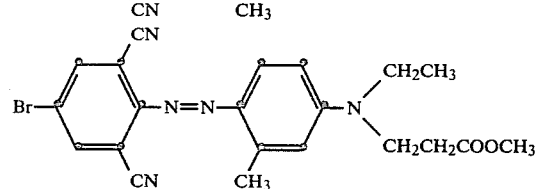 | bluish red |
| 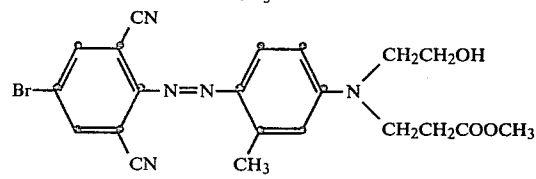 | bluish red |
| 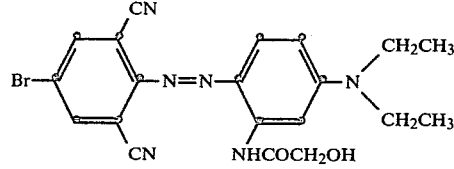 | red-violet |
| 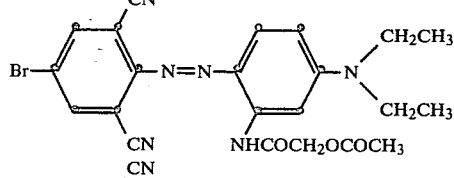 | red-violet |
| 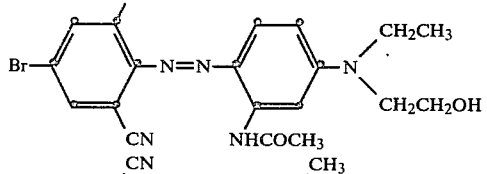 | red-violet |
| 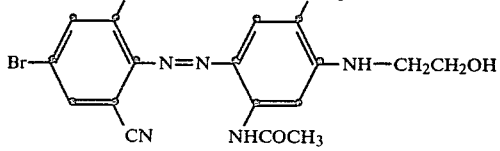 | red-violet |

| Dyestuff | Shade |
|---|---|
| [structure: 4-Cl, 2,6-diCN phenyl–N=N–(2-methyl-4-N(CH₂CH₂OH)(CH₂CH₂CH₂CH₃)phenyl)] | bluish red |
| [structure: 4-Cl, 2,6-diCN phenyl–N=N–(2-methyl-4-N(CH₂CH₂CH₂CH₃)(CH₂CH₂Cl)phenyl)] | bluish red |
| [structure: 4-Cl, 2,6-diCN phenyl–N=N–(2-methyl-4-N(CH₂CH₂CH₂CH₃)(CH₂CH₂OCOCH₃)phenyl)] | bluish red |
| [structure: 4-Cl, 2,6-diCN phenyl–N=N–(2-methyl-4-N(CH₂CH₂OH)(CH₂CH₂COOCH₃)phenyl)] | bluish red |
| [structure: 4-Cl, 2,6-diCN phenyl–N=N–(3-NHCOCH₂OH-4-N(CH₂CH₃)₂ phenyl)] | red-violet |
| [structure: 4-Cl, 2,6-diCN phenyl–N=N–(3-NHCOCH₂CH₃-4-N(CH₂CH₂OH)(CH₂CH₃)phenyl)] | red-violet |
| [structure: 4-Cl, 2,6-diCN phenyl–N=N–(3-NHCOCH₃-4-N(CH₂CH₃)(CH₂CH₂COOCH₃)phenyl)] | red-violet |
| [structure: 4-Cl, 2,6-diCN phenyl–N=N–(3-NHCOCH₃-4-methyl-substituted phenyl–NHCH₂CH₂OH)] | red-violet |
| [structure: 4-CH₃, 2,6-diCN phenyl–N=N–(4-N(CH₂CH₃)(CH₂CH₂OH)phenyl)] | scarlet |
| [structure: 4-CH₃, 2,6-diCN phenyl–N=N–(4-N(CH₂CH₂CH₂CH₃)(CH₂CH₂OH)phenyl)] | yellowish red |

TABLE-continued
| Dyestuff | Shade |
|---|---|
| 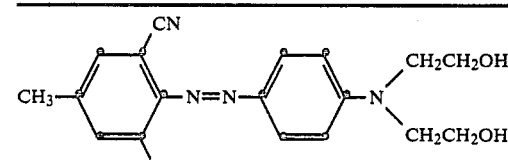 | yellowish red |
| 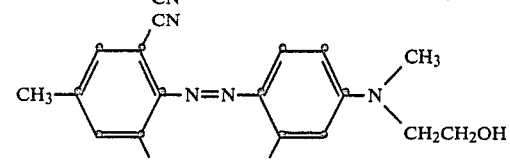 | red |
| 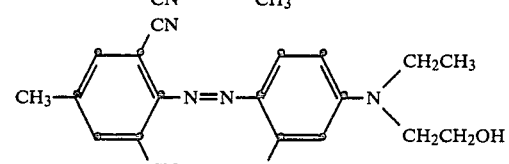 | red |
| 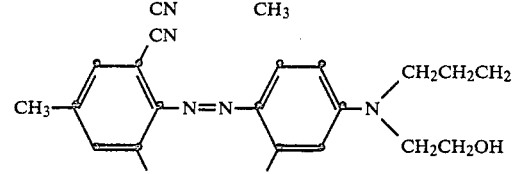 | bluish red |
| 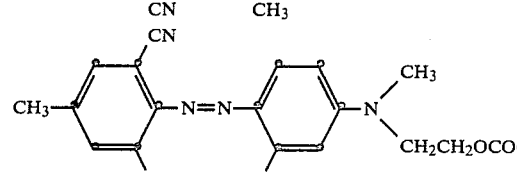 | yellowish red |
| 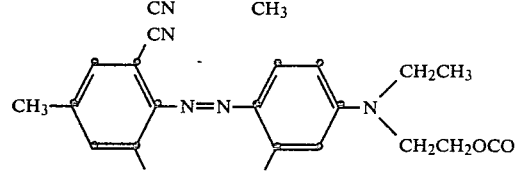 | yellowish red |
| 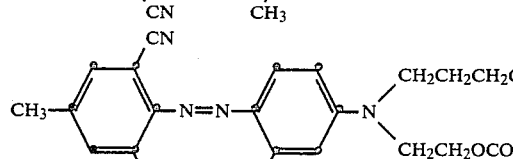 | red |
| 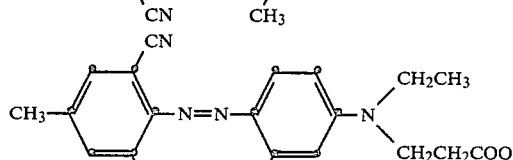 | red |
| 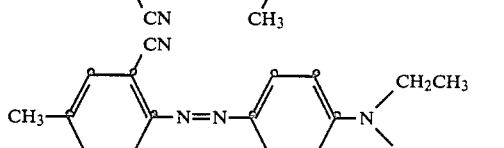 | yellowish red |
| 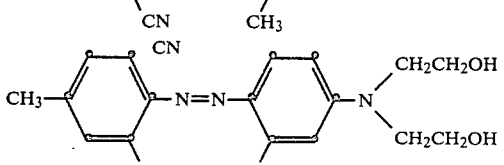 | bluish red |

TABLE-continued

| Dyestuff | Shade |
|---|---|
| 2,6-dicyano-4-methylphenyl-azo-[4-(N,N-bis(2-hydroxyethyl)amino)-3-acetylamino-phenyl] | bluish red |
| 2,6-dicyano-4-methylphenyl-azo-[4-(N-(2-hydroxyethyl)amino)-2-methyl-5-acetylamino-phenyl] | bluish red |
| 2,6-dicyano-4-methylphenyl-azo-[4-(N,N-bis(2-hydroxyethyl)amino)-3-methyl-5-acetylamino-phenyl] | bluish red |
| 2,6-dicyano-4-methylphenyl-azo-[4-(N,N-bis(2-hydroxyethyl)amino)-3-methoxy-5-acetylamino-phenyl] | reddish violet |
| 2,6-dicyano-4-methylphenyl-azo-[4-(N-ethyl-N-(2-hydroxyethyl)amino)-3-acetylamino-phenyl] | bluish red |
| 2,6-dicyano-4-methylphenyl-azo-[4-(N,N-diethyl)amino-3-(chloroacetylamino)-phenyl] | bluish red |
| 2,6-dicyano-4-methylphenyl-azo-[4-(N,N-bis(2-hydroxyethyl)amino)-3-(ethoxycarbonylamino)-phenyl] | bluish red |
| 2,6-dicyano-4-methylphenyl-azo-[4-(N-(2-hydroxyethyl)amino)-2-methyl-5-propionylamino-phenyl] | bluish red |
| 2,6-dicyano-4-methylphenyl-azo-[4-(N-ethyl-N-(2-hydroxyethyl)amino)-3-propionylamino-phenyl] | bluish red |
| 2,6-dicyano-4-methylphenyl-azo-[4-(N,N-diethyl)amino-3-propionylamino-phenyl] | bluish red |

(Note: structures rendered schematically; see original figures for exact chemical drawings.)

Structures as drawn:

1. CH₃–[2,6-(CN)₂-phenyl]–N=N–[phenyl with NHCOCH₃ and N(CH₂CH₂OH)₂] — bluish red
2. CH₃–[2,6-(CN)₂-phenyl]–N=N–[phenyl with CH₃, NHCOCH₃, N(H)(CH₂CH₂OH)] — bluish red
3. CH₃–[2,6-(CN)₂-phenyl]–N=N–[phenyl with CH₃, NHCOCH₃, N(CH₂CH₂OH)₂] — bluish red
4. CH₃–[2,6-(CN)₂-phenyl]–N=N–[phenyl with OCH₃, NHCOCH₃, N(CH₂CH₂OH)₂] — reddish violet
5. CH₃–[2,6-(CN)₂-phenyl]–N=N–[phenyl with NHCOCH₃, N(CH₂CH₃)(CH₂CH₂OH)] — bluish red
6. CH₃–[2,6-(CN)₂-phenyl]–N=N–[phenyl with NHCOCH₂Cl, N(CH₂CH₃)₂] — bluish red
7. CH₃–[2,6-(CN)₂-phenyl]–N=N–[phenyl with NHCOOC₂H₅, N(CH₂CH₂OH)₂] — bluish red
8. CH₃–[2,6-(CN)₂-phenyl]–N=N–[phenyl with CH₃, NHCOCH₂CH₃, N(H)(CH₂CH₂OH)] — bluish red
9. CH₃–[2,6-(CN)₂-phenyl]–N=N–[phenyl with NHCOCH₂CH₃, N(CH₂CH₃)(CH₂CH₂OH)] — bluish red
10. CH₃–[2,6-(CN)₂-phenyl]–N=N–[phenyl with NHCOCH₂CH₃, N(CH₂CH₃)₂] — bluish red TABLE-continued
| Dyestuff | Shade |
|---|---|
| 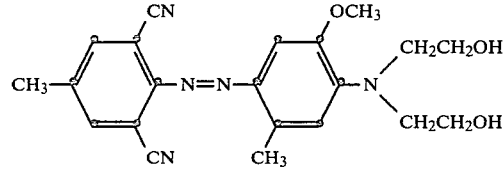 | bluish red |
| 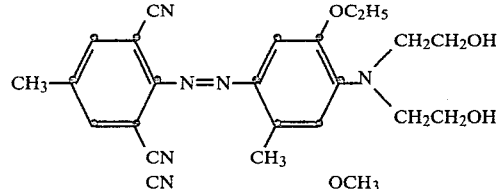 | bluish red |
| 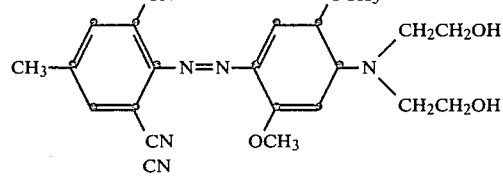 | bluish red |
| 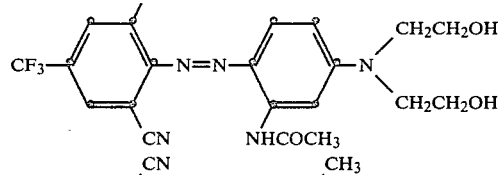 | red-violet |
| 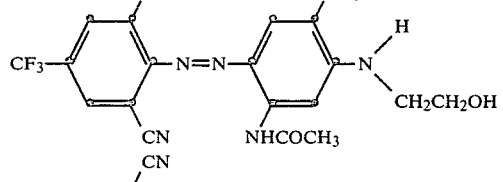 | red-violet |
| 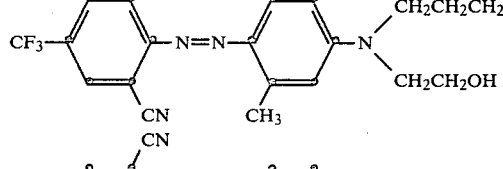 | bluish red |
| 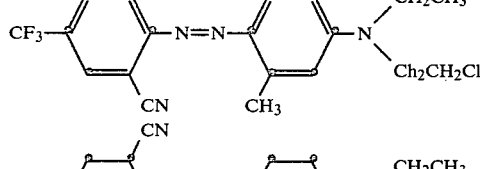 | bluish red |
| 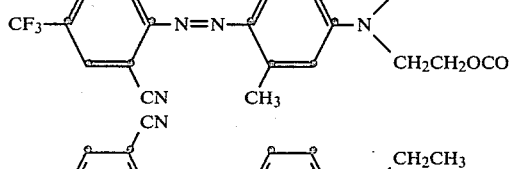 | bluish red |
| 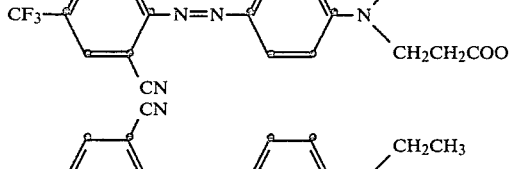 | bluish red |
| 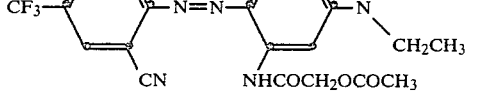 | red-violet |

TABLE-continued

| Dyestuff | Shade |
|---|---|
| 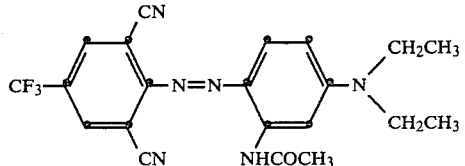 | red-violet |
| 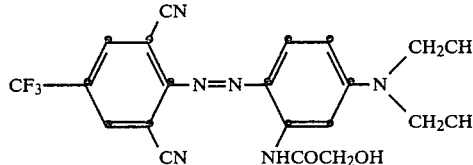 | red-violet |
| 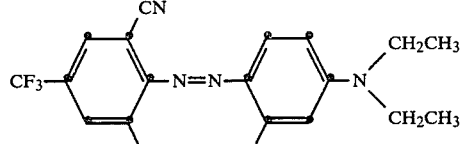 | red-violet |
| 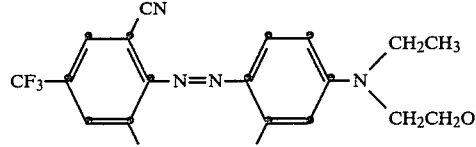 | red-violet |
| 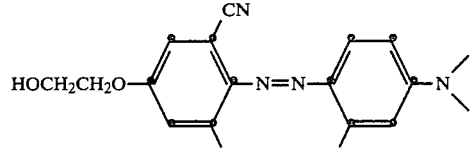 | red |
| 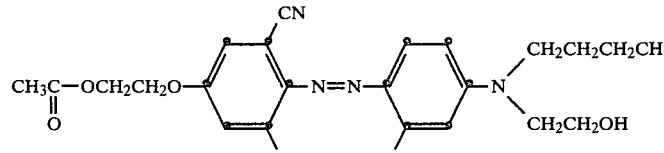 | red |
| 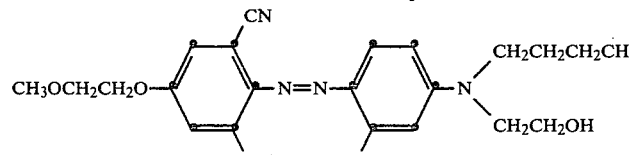 | red |
| 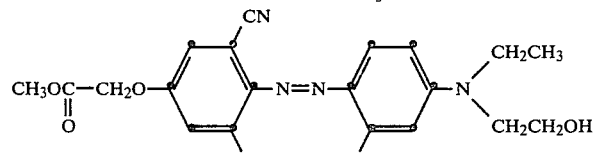 | red |

EXAMPLE 12

0.25 Grams of the dyestuff of the formula

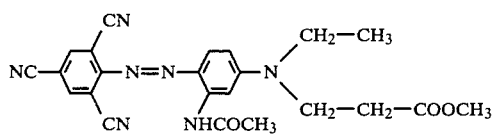

are introduced in dispersed form at 40°–50° C. into 1 liter of water which contains 0.5 g. of a sulphite cellulose decomposition product and 1 g. cresotic acid methyl ester. 25 Grams of polyester yarn are introduced into this bath, the temperature is raised to 100° C. within 30 minutes and boiling is continued for about 60–90 minutes. A violet dyeing of good fastness to wet processing and light is obtained.

If the same dyestuff is applied under the stated conditions to synthetic superpolyamide yarn, then a violet dyeing of good fastness to wet processing and light is also obtained.

Further dyestuffs compiled in Table 3 yield in an analogous manner the stated shades on polyester and synthetic polyamide fibres.

TABLE

| Dyestuff | Shade on polyester + synth. polyamide | |
|---|---|---|
| NC—C₆H(CN)(CN)—N=N—C₆H₃(C—CH₂—CH₃)—N(CH₂—CH₃)(CH₂—CH₃) | violet | violet |
| NC—C₆H(CN)(CN)—N=N—C₆H₃(CH₃)—N(CH₂—CH₃)(CH₂—CH₂—ON) | violet | violet |
| NC—C₆H(CN)(CN)—N=N—C₆H₂(OCH₃)(NHCOCH₃)—N(CH₂—CH₂—OH)(CH₂—CH₂—OH) | greenish blue | greenish blue |
| H₃COOC—C₆H(CN)(CN)—N=N—C₆H₃(CH₃)—N(CH₂—CH₂—OH)(CH₂—CH₂—OH) | red-violet | red-violet |
| CH₃OOC—C₆H(CN)(CN)—N=N—C₆H₃(OCH₂—CH₃)—N(CH₂—CH₃)(CH₂—CH₃) | red-violet | red-violet |
| Br—C₆H₂(CN)(CN)—N=N—C₆H₃(OC₂H₅)—N(CH₂—CH₃)(CH₂—CH₃) | red | red |
| NC—C₆H(CN)(CN)—N=N—C₆H₄—N(CH₂—CH₂—CN)(CH₂—CH₂—COCCH₃) | red | red |
| CH₃—C₆H(CN)(CN)—N=N—C₆H₃(NHCOCH₃)—N(CH₂—CH₃)(CH₂—CH₃) | red | red |
| C₆H₃(CN)(CN)—N=N—C₆H₃(OCH₂—CH₃)—N(CH₂—CH₃)(CH₂—CH₃) | red | red |
| CH₃O—C₆H(CN)(CN)—N=N—C₆H₃(NHCOCH₃)—N(CH₂—CH₃)(CH₂—CH₃) | red | red |
| NC—C₆H(CN)(CN)—N=N—(indole with C₆H₅, H) | red | red |

EXAMPLE 13

1 Gram of the dyestuff of the formula

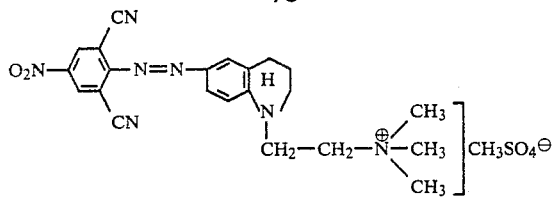

is dissolved in 3 liters of water with the addition of 3 ml. of 30% acetic acid. 100 Grams polyacrylonitrile fibre are introduced into this bath at 40°–50° C., the temperature of the dyebath is raised to 100° C., within about 40 minutes and dyeing is carried out at this temperature for about 1 hour. A violet dyeing of good fastness to wet processing results.

Under the dyeing conditions of the present Example the dyestuffs mentioned in Table 4 yield the stated shades on polyacrylonitrile fibres:

TABLE

| Dyestuff | Shade on polyacrylonitrile |
|---|---|
| (structure) | red-violet |
| (structure) | violet |
| (structure) | yellowish red |
| (structure) | bluish red |
| (structure) | violet |
| (structure) | violet |
| (structure) | blue |

TABLE-continued
| Dyestuff | Shade on polyacrylonitrile |
|---|---|
| 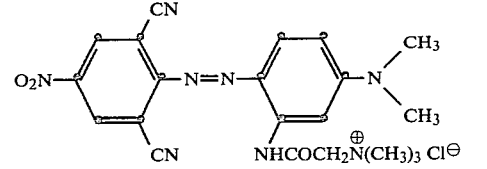 | blue |
| 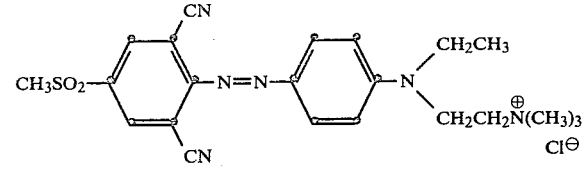 | bordeaux |
| 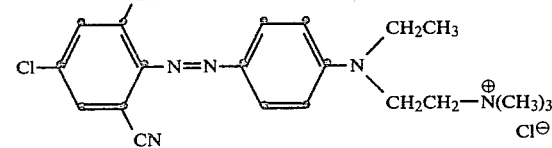 | yellowish red |
| 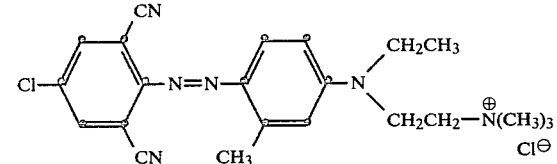 | red |
| 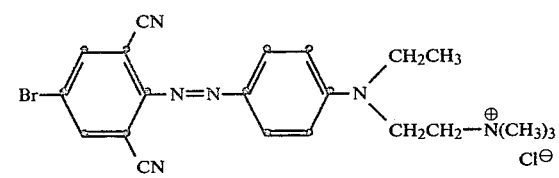 | yellowish red |
| 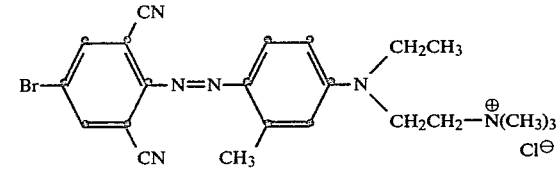 | red |
| 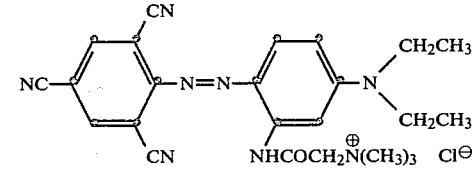 | violet |
| 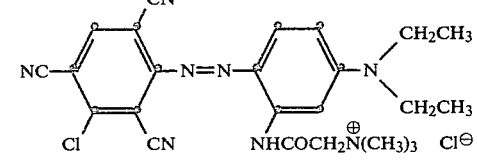 | violet |
| 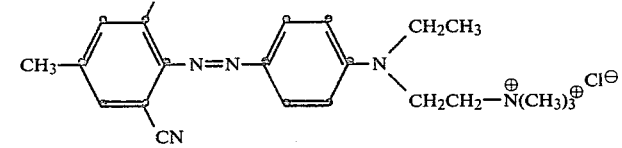 | scarlet |

TABLE-continued

| Dyestuff | Shade on polyacrylonitrile |
|---|---|
| (structure: 2,6-dicyano-4-methylphenyl–N=N–[4-(N-ethyl-N-(2-trimethylammoniumethyl)amino)-2-methylphenyl], Cl⁻) | yellowish red |
| (structure: 2,6-dicyano-4-trifluoromethylphenyl–N=N–[4-(N-ethyl-N-(2-trimethylammoniumethyl)amino)phenyl], Cl⁻) | yellowish red |
| (structure: 2,6-dicyano-4-trifluoromethylphenyl–N=N–[4-(N-ethyl-N-(2-trimethylammoniumethyl)amino)-2-methylphenyl], Cl⁻) | red |
| (structure: 2,6-dicyano-4-trifluoromethylphenyl–N=N–[4-(N-ethyl-N-(2-pyridiniumethyl)amino)phenyl], Cl⁻) | yellowish red |
| (structure: 2,6-dicyano-4-trifluoromethylphenyl–N=N–[4-(N-ethyl-N-(2-pyridinium-propyl)amino)-2-methylphenyl], Cl⁻) | red |
| (structure: 2,6-dicyano-4-trifluoromethylphenyl–N=N–[4-(N,N-diethylamino)-2-(NHCOCH₂N⁺(CH₃)₃)phenyl], Cl⁻) | red-violet |

EXAMPLE 14

0.1 Gram of the dyestuff of the formula

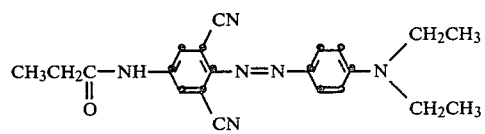

are introduced in well dispersed form at 40°–50° C. into 1 l of water which also contains 0,1–0,2 g polyethylene glycol. 10 g of synthetic superpolyamid yarn are introduced in this bath, the temperature is raised to 95°–100° C. within about 20 minutes and dyeing is carried out for about 1 hour. An intense clear red dyeing of good fastness to wet processing is obtained.

If in the present Example the substrate is replaced with 10 g. polyethyleneterephthalat yarn and dyed in presence of 0,1–0,2 g. 1-hydroxy-2-phenyl-benzene, then a clear red dyeing of good fastness is obtained.

Further dyestuffs compiled in the following table yield in an analogus manner the stated shades on polyester and synthetic superpolyamide fibres.

TABLE

| Dyestuff | Shade on synth. polyamide | polyester |
|---|---|---|
| (structure: CH₃–C(=O)–NH–[2,6-dicyanophenyl]–N=N–[4-(N,N-diethylamino)phenyl]) | red | red |

TABLE-continued

| Dyestuff | Shade on synth. polyamide | polyester |
|---|---|---|
| (structure) | red | red |
| (structure) | red | red |
| (structure) | pink | bluish red |
| (structure) | red | red |
| (structure) | red | red |
| (structure) | pink | bluish red |
| (structure) | ruby | bluish red |
| (structure) | red | red |
| (structure) | ruby | bluish red |
| (structure) | ruby | bluish red |

We claim:
1. Azo dyestuff of the formula

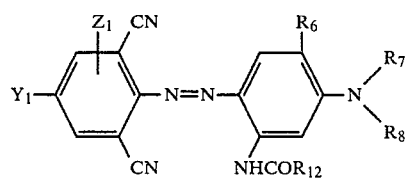

where $Y_1$ is $NO_2$, $CF_3$, phenyl, $OR_1'$, $SO_2R_1$,

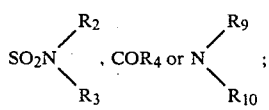

$R_{12}$ is $NH_2$, $OCH_3$, $OC_2H_3$, $C_2H_5$, $CH_2OH$, $CH_2Cl$, $C_2H_4Cl$ or $CH_2OCOCH_3$;
$R_6$ is H, $CH_3$, $OCH_3$, or $OC_2H_5$;

$R_7$ and $R_8$ each are H, $C_{1-4}$ alkyl, $-CH_2C_6H_5$, or substituted $C_{1-4}$ alkyl wherein the substituents are OH, CN, $OCH_3$, Cl, $COOCH_3$, $COOC_2H_5$, $OCOCH_3$, $OCOOCH_3$ or $OC_2H_4OH$;

$Z_1$ is H or Cl;

$R_1$ is $CH_3$, $C_2H_5$, or phenyl; $R_1{}'$ is $CH_3$, $C_2H_5$, $C_2H_4OH$, $C_2H_4OCOCH_3$, $C_2H_4OCH_3$ or $CH_2COOCH_3$;

$R_2$ and $R_3$ are H or $CH_3$;

$R_4$ is H, OH, $R_1$, $OR_1$ or

$R_9$ is formyl; alkyl carbonyl with 1–4 carbons in the alkyl group; substituted alkyl carbonyl with 1–4 carbons in the alkyl group wherein the substituents are OH, Cl, CN, $NH_2$, $OCOCH_3$ or $OCOC_2H_5$; phenyl carbonyl; substituted phenyl carbonyl wherein the phenyl radical is substituted with $CH_3$, Cl, $NO_2$ or $OCH_3$; benzyl carbonyl; methyl sulfonyl; phenyl sulfonyl; tolyl sulfonyl; amino carbonyl; amino carbonyl containing $CH_3$ or $C_2H_5$ substituents; alkoxy carbonyl wherein the alkyl member contains 1 to 2 atoms; benzyloxy carbonyl; phenylsulfonyl; methylsulfonyl or phenyloxycarbonyl; and $R_{10}$ is H, alkyl with 1–4 carbon atoms or cyclohexyl.

2. Azo dyestuff of claim 1 wherein $Y_1$ is $NO_2$;

$Z_1$ is H;

$R_6$ is H or $OCH_3$;

$R_{12}$ is $CH_3$, $CH_2OH$, $CH_2OCOCH_3$, $CH_2Cl$, $C_2H_4Cl$ or $OCH_3$;

$R_7$ is $CH_3$, $C_2H_5$, $C_4H_9$, $C_2H_4OH$, $C_2H_4OCO_2CH_3$ or $C_2H_4OCOCH_3$; and $R_8$ is $C_2H_5$, $C_2H_4OH$, $C_2H_4CN$, $C_2H_4CO_2CH_3$ or $C_2H_4OC_2H_4OH$.

3. Dyestuff of claim 1 wherein the dyestuff is

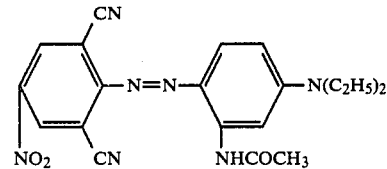

4. The dyestuff of claim 1 wherein $R_7$ and $R_8$ are $C_1$-$C_4$ alkyl.

5. The dyestuff of claim 1 wherein the dyestuff is

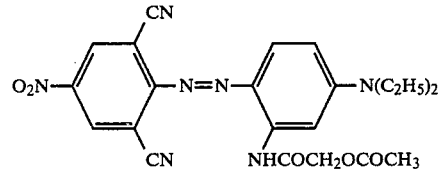

* * * * *

UNITED STATES PATENT AND TRADEMARK OFFICE
CERTIFICATE OF CORRECTION

PATENT NO. : 4,237,048

DATED : December 2, 1980

INVENTOR(S) : Alois Gottschlich et al

It is certified that error appears in the above-identified patent and that said Letters Patent are hereby corrected as shown below:

Column 1, line 50, change "-B$_1$" to -- -R$_1$ --.
Column 2, line 40, the last formula should be

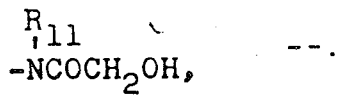

Column 4, line 29, change "case" to -- ease --.
Column 6, line 3, change "1-hydroxy-3-benzene" to -- 1-hydroxy-3-methyl-benzene --.
Column 8, line 48, change "p" (both occurrences) to -- β --.
Column 8, line 49, change "3" to -- 5 --.
Column 10, line 23, correct the spelling of "calculated".
Column 12, compound 10, change "80°" to -- 60° --.
Column 14, compound 20, change "60°" to -- 50° --
Column 17, line 26; column 17, line 37, change "p" to -- β --.
Column 18, line 36, change "P" to -- β --.
Column 20, compound 4, change "160°" to -- 150° --.
Column 20, compound 6 should be

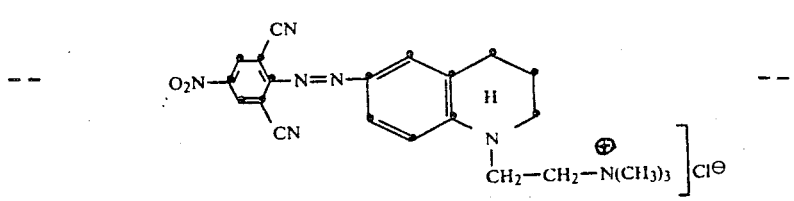

Column 20, compound 8 should be

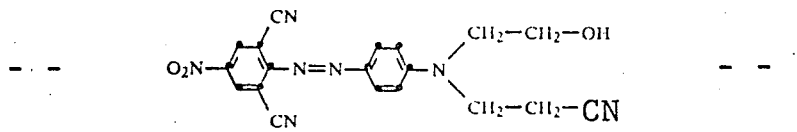

UNITED STATES PATENT AND TRADEMARK OFFICE
CERTIFICATE OF CORRECTION

PATENT NO. : 4,237,048
DATED : December 2, 1980
INVENTOR(S) : Alois Gottschlich et al It is certified that error appears in the above-identified patent and that said Letters Patent are hereby corrected as shown below:

Column 1, line 50, change "-B$_1$" to -- -R$_1$ --.
Column 2, line 40, the last formula should be Column 4, line 29, change "case" to -- ease --.
Column 6, line 3, change "1-hydroxy-3-benzene" to -- 1-hydroxy-3-methyl-benzene --.
Column 8, line 48, change "p" (both occurrences) to -- β --.
Column 8, line 49, change "3" to -- 5 --.
Column 10, line 23, correct the spelling of "calculated".
Column 12, compound 10, change "80°" to -- 60° --.
Column 14, compound 20, change "60°" to -- 50° --.
Column 17, line 26; column 17, line 37, change "p" to -- β --.
Column 18, line 36, change "P" to -- β --.
Column 20, compound 4, change "160°" to -- 150° --.
Column 20, compound 6 should be

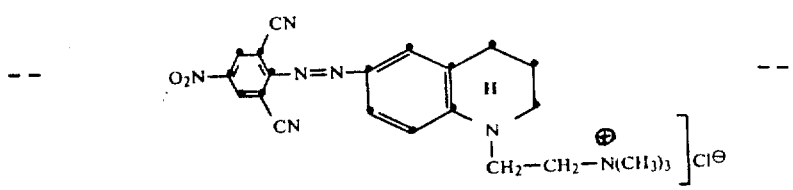

Column 20, compound 8 should be

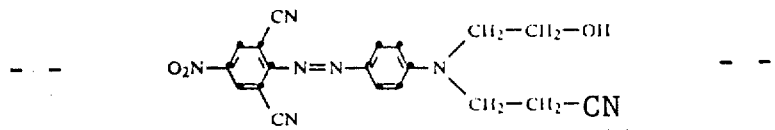

UNITED STATES PATENT AND TRADEMARK OFFICE
CERTIFICATE OF CORRECTION

PATENT NO. : 4,237,048
DATED : December 2, 1980
INVENTOR(S) : Alois Gottschlich et al It is certified that error appears in the above-identified patent and that said Letters Patent are hereby corrected as shown below:

Column 27, compound 50 should be

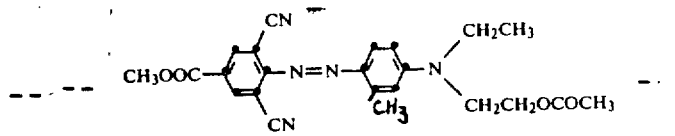

Column 54, line 46, correct the spelling of "well".
Column 55, 3rd compound should be

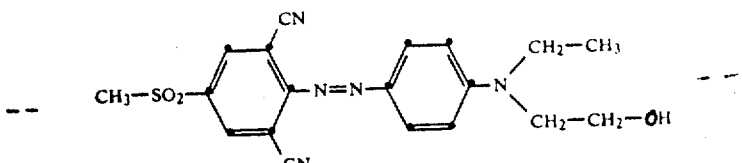

Column 67, second compound from the bottom should be

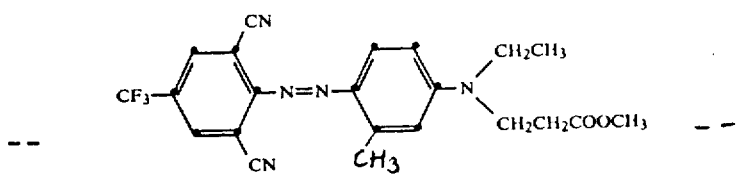

Column 71 refers to compounds in the table should be

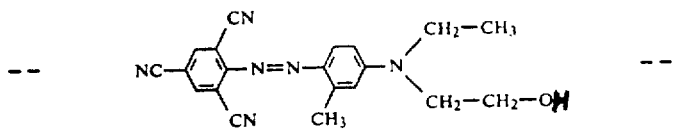

UNITED STATES PATENT AND TRADEMARK OFFICE
CERTIFICATE OF CORRECTION

PATENT NO. : 4,237,048
DATED : December 2, 1980
INVENTOR(S) : Alois Gottschlich et al It is certified that error appears in the above-identified patent and that said Letters Patent are hereby corrected as shown below:

Column 71, 7th compound should be

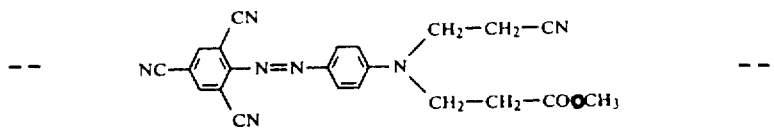

Signed and Sealed this

*Thirty-first* Day of *March 1981*

[SEAL]

*Attest:*

RENE D. TEGTMEYER

*Attesting Officer*   *Acting Commissioner of Patents and Trademarks*